United States Patent
Kulbida

(10) Patent No.: US 11,206,294 B2
(45) Date of Patent: Dec. 21, 2021

(54) METHOD FOR SEPARATING LOCAL AND REMOTE CONTENT IN A CAMERA-PROJECTOR BASED COLLABORATIVE SYSTEM

(71) Applicant: Konica Minolta Business Solutions U.S.A., Inc., San Mateo, CA (US)

(72) Inventor: Jie Kulbida, Broomfield, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 0 days.

(21) Appl. No.: 16/836,074

(22) Filed: Mar. 31, 2020

(65) Prior Publication Data

US 2021/0306389 A1     Sep. 30, 2021

(51) Int. Cl.
*H04L 29/06*     (2006.01)
*G06T 19/00*     (2011.01)

(52) U.S. Cl.
CPC ........ *H04L 65/4015* (2013.01); *G06T 19/006* (2013.01); *H04L 65/403* (2013.01); *G06T 2219/024* (2013.01)

(58) Field of Classification Search
CPC . H04L 65/4015; H04L 65/403; G06T 19/006; G06T 2219/024
See application file for complete search history.

(56) References Cited

U.S. PATENT DOCUMENTS

| | | | | |
|---|---|---|---|---|
| 8,698,873 B2* | 4/2014 | Barrus | ..................... | H04N 7/15 348/14.08 |
| 9,560,314 B2 | 1/2017 | Junuzovic et al. | | |
| 2005/0180631 A1 | 8/2005 | Zhang et al. | | |
| 2012/0320157 A1* | 12/2012 | Junuzovic | .............. | G03B 17/54 348/46 |
| 2012/0320158 A1* | 12/2012 | Junuzovic | ............ | G06Q 10/101 348/46 |
| 2017/0316600 A1* | 11/2017 | Jeong | .................... | G06T 3/0062 |

(Continued)

OTHER PUBLICATIONS

Spatial Augmented Reality Merging Real and Virtual Worlds, written by Oliver Bimber and Ramesh Raskar, 2005, AK Peters Ltd, relevant section p. 141 section 5.4.8 (Year: 2005).*

*Primary Examiner* — Michael A Keller
*Assistant Examiner* — Jsing Forng Lin
(74) *Attorney, Agent, or Firm* — Osha Bergman Watanabe & Burton LLP

(57) ABSTRACT

An image processing method, for collaborating between a first augmented reality (AR) workspace and a second AR workspace, includes: calibrating the first AR workspace by creating a camera-to-shared space transformation between a camera coordinate space and a shared coordinate space, and a shared space-to-projector transformation between the shared coordinate space and a projector coordinate space; obtaining a remote composite image of a foreground content in the second AR workspace; generating a projector image by applying the shared space-to-projector transformation to the remote composite image; projecting the projector image into the first AR workspace; obtaining an input image of the first AR workspace that includes the projector image and a foreground content of the first AR workspace; generating an output image by applying the camera-to-shared space transformation to the input image; and obtaining a remote mask based on the remote composite image.

20 Claims, 13 Drawing Sheets

(56) References Cited

U.S. PATENT DOCUMENTS

| | | | |
|---|---|---|---|
| 2019/0088004 A1* | 3/2019 | Lucas | G06K 9/6202 |
| 2019/0114802 A1* | 4/2019 | Lazarow | G06F 1/163 |
| 2020/0051336 A1* | 2/2020 | Ichikawa | G06F 3/011 |
| 2020/0066046 A1* | 2/2020 | Stahl | G06T 19/006 |
| 2020/0153885 A1* | 5/2020 | Lee | G06T 9/001 |
| 2020/0250889 A1* | 8/2020 | Li | G06T 7/246 |

* cited by examiner

MO2

METHOD FOR SEPARATING LOCAL AND REMOTE CONTENT IN A CAMERA-PROJECTOR BASED COLLABORATIVE SYSTEM

BACKGROUND

Augmented Reality (AR) allows a user to interact with a computer-generated AR output overlaid on and/or around real objects in a workspace environment. For example, a dynamic and interactive AR environment has potential to be quite useful in a business environment that requires user to remotely collaborate. However, generating and processing a collaborative AR environment may be computationally expensive when working with multiple integrated workspaces and/or high resolution AR content.

SUMMARY

In general, one or more embodiments of the invention relate to an image processing method for collaborating between a first augmented reality (AR) workspace and a second AR workspace. The method comprises: calibrating the first AR workspace by creating a camera-to-shared space transformation between a camera coordinate space and a shared coordinate space, and a shared space-to-projector transformation between the shared coordinate space and a projector coordinate space; obtaining a remote composite image of a foreground content in the second AR workspace (the remote composite image is formatted in the shared coordinate space); generating a projector image by applying the shared space-to-projector transformation to the remote composite image; projecting the projector image into the first AR workspace; obtaining an input image of the first AR workspace that includes the projector image and a foreground content of the first AR workspace (the input image is formatted in the camera coordinate space); generating an output image by applying the camera-to-shared space transformation to the input image (the output image is formatted in the shared coordinate space); obtaining a remote mask based on the remote composite image; eliminating the projector image and preserving the foreground content of the first AR workspace by applying the remote mask to the output image and generating a masked output image; and sending the masked output image to the second AR workspace.

In general, one or more embodiments of the invention relate to a non-transitory computer readable medium (CRM) storing computer readable program code for collaborating between a first augmented reality (AR) workspace and a second AR workspace. The computer readable program code causes a computer to: calibrate the first AR workspace by creating a camera-to-shared space transformation between a camera coordinate space and a shared coordinate space, and a shared space-to-projector transformation between the shared coordinate space and a projector coordinate space; obtain a remote composite image of a foreground content in the second AR workspace (the remote composite image is formatted in the shared coordinate space); generate a projector image by applying the shared space-to-projector transformation to the remote composite image; project the projector image into the first AR workspace; obtain an input image of the first AR workspace that includes the projector image and a foreground content of the first AR workspace (the input image is formatted in the camera coordinate space); generate an output image by applying the camera-to-shared space transformation to the input image (the output image is formatted in the shared coordinate space); obtain a remote mask based on the remote composite image; eliminate the projector image and preserve the foreground content of the first AR workspace by applying the remote mask to the output image and generating a masked output image; and send the masked output image to the second AR workspace.

In general, one or more embodiments of the invention relate to a system for collaborating between a first augmented reality (AR) workspace and a second AR workspace. The system comprises a memory and a processor coupled to the memory. The processor: calibrates the first AR workspace by creating a camera-to-shared space transformation between a camera coordinate space and a shared coordinate space, and a shared space-to-projector transformation between the shared coordinate space and a projector coordinate space; obtains a remote composite image of a foreground content in the second AR workspace (the remote composite image is formatted in the shared coordinate space); generates a projector image by applying the shared space-to-projector transformation to the remote composite image; projects the projector image into the first AR workspace; obtains an input image of the first AR workspace that includes the projector image and a foreground content of the first AR workspace (the input image is formatted in the camera coordinate space); generates an output image by applying the camera-to-shared space transformation to the input image, (the output image is formatted in the shared coordinate space); obtains a remote mask based on the remote composite image; eliminates the projector image and preserves the foreground content of the first AR workspace by applying the remote mask to the output image and generating a masked output image; and sends the masked output image to the second AR workspace.

Other aspects of the invention will be apparent from the following description and the appended claims.

DETAILED DESCRIPTION

Figure 1:
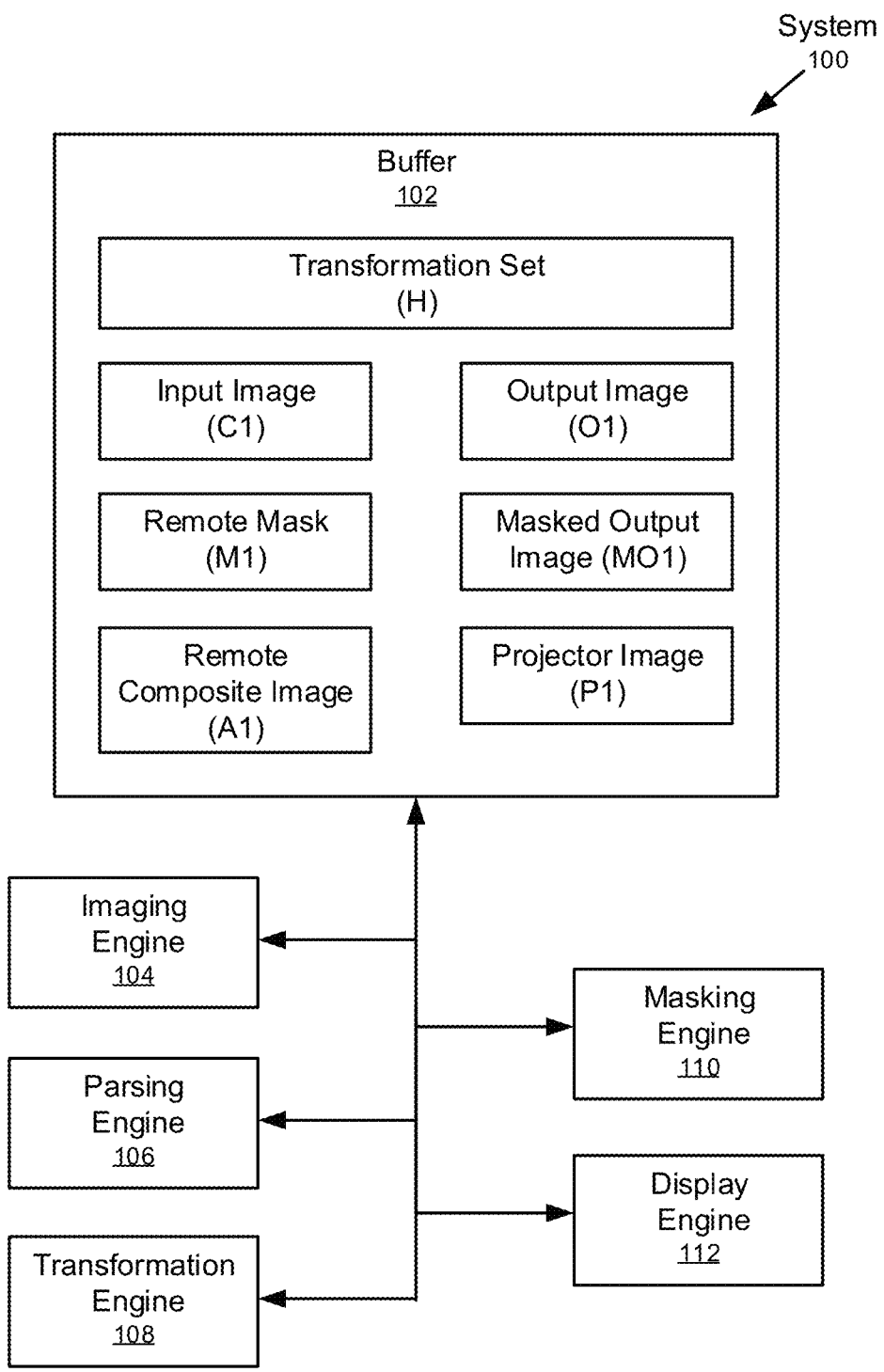
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the invention provide a method, a non-transitory computer readable medium (CRM), and a system for processing an augmented reality (AR) image. More specifically, embodiments of the invention are directed to processing and sharing images between at least two collaborating AR workspaces. Each AR workspace may include a Projection with Interactive Capture (PIC) device that comprises a camera that captures images of the AR workspace and a projector that projects images into the AR workspace.

To efficiently share information between two collaboration AR workspaces (i.e., a first AR workspace and a second AR workspace), it is advantageous to differentiate between foreground content and background content of each AR workspace. Foreground content includes information, text, images, or any local content that a user may want to share with a remote AR workspace. Background content includes any information that is not necessary to share, such as background color and texture information and any content that originated from the remote AR workspace.

For example, an image captured by a camera in the first AR workspace contains local content written by the local user, as well as contributions from one or more remote user(s) that is projected into the first AR workspace. If the raw captured image were to be transmitted to the second AR workspace of the remote user(s), it would cause an undesirable echoing effect (i.e., with each transmission, a new layer of the remote content is sent back to remote workstations, and projected on top of the identical existing content at each AR workspace. Consequently, the appearance of the projected virtual content would be altered (e.g., projecting virtual blue stroke on top of a preexisting written blue stroke (i.e., with a marker) would change the color hue and intensity of that written stroke and cause confusion. Furthermore, sending unfiltered content back to remote users inevitably increases the data volume of each transmission and negatively impacts the real-time performance of each AR workspace. Therefore, embodiments of the present invention differentiate between local content to be shared with collaborators and background or remote content that is filtered out of the exchange of information.

FIG. 1 shows a system (100) in accordance with one or more embodiments of the invention. As shown in FIG. 1, the system (100) has multiple components, and may include, for example, a buffer (102), an imaging engine (104), a parsing engine (106), a transformation engine (108), a masking engine (110), and a display engine (112). Each of these components (102, 108, 110, 110, and 112) may be located on the same computing device (e.g., a personal computer (PC), laptop, tablet PC, smartphone, multifunction peripheral, kiosk, server, PIC device) or on different computing devices connected by a network of any size having wired and/or wireless segments. Each of these components is discussed in further detail below.

The buffer (102) may be implemented in hardware (i.e., circuitry), software (e.g., executed in CPU, GPU, FPGA), or any combination thereof. The buffer (102) is configured to store: a transformation set (H); an input image (C1); and output image (O1); a remote mask (M1); a masked output image (MO1); a remote composite image (A1); and a projector image (P1). Each of the transformation set (H), the images (C1, O1, MO1, A1, P1), and the remote mask (M1) are discussed in further detail below. Multiple versions of the transformation set, each image, and/or the remote mask may be stored in the buffer (102).

The transformation set (H) is a set of one or more geometric transformations (i.e., transformation), each of which define a relationship between two different coordinate systems (i.e., coordinate spaces).

For example, in an AR workspace, a projector projects an image onto a surface and a camera captures an image of the projection. The projected image and the captured image of the projection may not be identical due to differences between the projector and camera (e.g., spatial separation, resolution, field of view, color space, etc.). A matrix of one or more dimensions may be used to reconcile one or more of the differences (e.g., scale, rotation, perspective, resolution, etc.) between the projected image and the captured image of the projection. By applying an appropriate transformation to the captured image, the transformed captured image may appear identical to the projected image. In one or more embodiments, the transformation may be reversible (i.e., when an inverse of the transformation is applied to the projected image, the transformed projected image may appear identical to the captured image).

In one or more embodiments, the transformation set (H) includes at least two transformations: a camera-to-shared space transformation (Hcs) between a camera coordinate space and a shared coordinate space; and a shared space-to-projector transformation (Hsp) between the shared coordinate space and a projector coordinate space. The transformation set (H) may include additional transformations such as: a camera-to-projector transformation (Hcp) between the camera coordinate space and the projector coordinate space; a projector-to-world transformation (Hpw) between the projector coordinate space and the physical coordinates of the AR workspace; a camera-to-world transformation (Hcw) between the camera coordinate space and the physical coordinates of the AR workspace. Furthermore, any appropriate singular transformation (e.g., rotation, translation, scale, skew, cropping, or any appropriate image processing function) or combination of transformations, such as a convolution of one or more transformations (e.g., a camera-to-world transformation (Hcw) that is a combination of the camera-to-projector transformation (Hcp) and the projector-to-world transformation (Hpw)) may be included in the transformation set (H).

The input image (C1) is an image of an AR workspace that is captured by a camera. The AR workspace may include a surface of any type (e.g., a desk, a piece of paper, a wall, a whiteboard, a floor). Further, the AR workspace may comprise multiple work surfaces, irregular surfaces, or spatially separated surfaces, but is not particularly limited to these configurations. Accordingly, the input image (C1) may include a single image or multiple images.

The input image (C1) may be formatted in the camera coordinate space and may be saved in the buffer (102) in any imaging format (e.g., a JPEG image, a GIF image, a bitmap image, a TIFF image, a PDF document).

The output image (O1) is an image of the AR workspace that has been transformed into the shared coordinate space by applying the camera-to-shared space transformation (Hcs) and/or image processing operations to the input image (C1). In one or more embodiments, the camera-to-shared space transformation (Hcs) first generates an intermediate image (W1) that is an upright version of the AR workspace. Various image processing operations (e.g., cropping, scaling, de-skewing, smoothing, sharpening, color balance, enhancing) may be applied to the intermediate image (W1) to produce the output image (O1). In one or more embodiments, the camera-to-shared space transformation (Hcs) may include the image processing operations in addition to the geometric coordinate transformation between the two coordinate systems.

The output image (O1) may be formatted in the shared coordinate space and may be saved in the buffer (102) in any imaging format (e.g., a JPEG image, a GIF image, a bitmap image, a TIFF image, a PDF document). While not shown in FIG. 1, the intermediate image (W1) may also be saved in the buffer (102) in any imaging format or as part of the output image (O1) (e.g., as meta data).

The remote composite image (A1) is an output image received from the second AR workspace. The remote composite image (A1) contains only remote content (e.g., foreground content of the second AR workspace). When the second AR workspace includes multiple remote workstations (i.e., multiple collaborating AR workspaces), the remote composite image (A1) is generated by merging the output images received from all of the remote workstations.

The remote composite image (A1) may be formatted in the shared coordinate space and may be saved in the buffer (102) in any imaging format (e.g., a JPEG image, a GIF image, a bitmap image, a TIFF image, a PDF document).

The remote mask (M1) is a filter that emphasizes foreground content in an image of the AR workspace (e.g., markings, content, changes made by a user) and eliminates background content in the image of the AR workspace (e.g., texture of a surface in the AR workspace, virtual content that is projected into the AR workspace). A remote mask (M1) may be binary (e.g., a single bit that determines whether a pixel is used or eliminated), multibit (e.g., multiple bits determine how strongly the pixel is emphasized or eliminated), and/or multi-dimensional (e.g., multiple masks corresponding to different color channels, different spatial dimensions, different collaborators).

The remote mask (M1) may be formatted in the shared coordinate space and may be saved in the buffer (102) in any imaging format (e.g., a JPEG image, a GIF image, a bitmap image, a TIFF image, a PDF document).

The masked output image (MO1) is an output image (O1) that has been masked by a remote mask (M1). The masked output image (MO1) contains only the local foreground content after eliminating background and remote content identified by remote mask (M1).

The masked output image (MO1) may be formatted in the shared coordinate space and may be saved in the buffer (102) in any imaging format (e.g., a JPEG image, a GIF image, a bitmap image, a TIFF image, a PDF document).

The projector image (P1) is a remote composite image (A1) that has been transformed from the shared coordinate space to the projector coordinate space by applying the shared space-to-projector transformation (Hsp). The projector image (P1) is projected into the first AR workspace as virtual content and only includes remote content (e.g., foreground content of the second AR workspace).

The projector image (P1) may be formatted in the projector coordinate space and may be saved in the buffer (102) in any imaging format (e.g., a JPEG image, a GIF image, a bitmap image, a TIFF image, a PDF document).

The system (100) includes the imaging engine (104). The imaging engine (104) may be implemented in hardware (i.e., circuitry), software (e.g., executed in CPU, GPU, FPGA), or any combination thereof. The imaging engine (104) obtains an image of the AR workspace (e.g., captures an image, compiles one or more images) to generates the input image (C1).

In one or more embodiments, the imaging engine (104) may include a 2-dimensional and/or 3-dimensional imager (e.g., a camera, a combination of one or more cameras) that is able to capture a digital image of the AR workspace. The imaging engine (104) may continuously image the AR workspace. The imaging engine (104) may image the AR workspace at predetermined intervals, in response to predetermined conditions, upon user request, or any combination thereof.

In addition, the imaging engine (104) obtains one or more remote images from one or more remote AR workspaces (i.e., remote workstations) to generate the remote composite image (A1). In one or more embodiments, the imaging engine (104) connects to the remote workstations (e.g., using a communication transceiver connected to a wireless or wired network) to retrieve the remote images. The imaging engine (104) may continuously retrieve remote images. The imaging engine (104) may retrieve remote images at predetermined intervals, in response to predetermined conditions, upon user request, or any combination thereof. The imaging engine (104) may combine the one or more remote images to generate the remote composite image (A1).

The system (100) further includes the parsing engine (106). The parsing engine (106) may be implemented in hardware (i.e., circuitry), software (e.g., executed in CPU, GPU, FPGA), or any combination thereof. The parsing engine (106) parses the input image (C1) to identify a working region of the AR workspace (e.g., a piece of paper, a whiteboard, any appropriate surface, a space above the surface, any combination thereof) and changes to the working region (e.g., addition or removal of markings, text, images, and objects). In one or more embodiments, the parsing engine (106) may identify and track changes in multiple working regions of the input image (C1).

The parsing engine (106) may perform an optical character recognition (OCR), pattern recognition, object recognition, and/or any appropriate content analysis to identify the working region of the AR workspace in the input image (C1). The parsing engine (106) may also identify a background content of the working region (e.g., a color and extent of the working region, calibration markers, control interfaces) and a foreground content of the working region (e.g., added or changed content, markings, images, and/or objects identified as the stable change).

Furthermore, the parsing engine (106) may perform an optical character recognition (OCR), pattern recognition, object recognition, and/or any appropriate content analysis to identify a stable change to the working region. A stable change may be any change in a region that persists for a predetermined amount of time. Determination of the stable change may be performed using any appropriate metrics for the change and the predetermined amount of time. For example, the change may be characterized by a change in an intensity level of a pixel between two different captured images (i.e., a value threshold) and/or a number of pixels in a region where a change in intensity exceeds a predetermined threshold (i.e., a count threshold). The predetermined amount of time may be any appropriate value to distinguish stable changes from unwanted artifacts (e.g., a user's hand passing over some foreground content, causing the associated pixels to briefly change). In one or more embodiments, the method of detecting the stable change (e.g., image recognition programs, predetermined threshold values, predetermined time intervals) may be dynamically updated during the collaboration session based on user behavior, user responsiveness, user commands, error reporting, system resource limitations, network resource limitations, or any combination thereof.

Any parsing program (e.g., a word recognition program, a table recognition program, an image recognition program) that is able to identify or track changes to a working region within the input image (C1) may be utilized by the parsing engine (106).

The system (100) further includes the transformation engine (108). The transformation engine (108) may be implemented in hardware (i.e., circuitry), software (e.g., executed in CPU, GPU, FPGA), or any combination thereof. The transformation engine (108) computes and applies transformations from the transformation set (H).

Any program (e.g., an image processing program) that is able to manipulate images and/or masks may be utilized by the transformation engine (108). Furthermore, the transformation engine (108) may work in combination with one or more other engines of the system (100) to compute and/or apply transformations to an image or a mask. For example, the transformation engine (108) may obtain images and/or information from one or more other engines (104, 106, 110, and 112) to compute a transformation. In another example, the transformation engine (108) may apply a cropping transformation based on information about a working region from the parsing engine (106). In yet another example, the transformation engine (108) works in combination with the masking engine (110), discussed below, to create a mask that emphasizes foreground content and eliminates background content in an image altering pixels of the image.

The system (100) further includes the masking engine (110). The masking engine (110) may be implemented in hardware (i.e., circuitry), software (e.g., executed in CPU, GPU, FPGA), or any combination thereof. The masking engine (110) creates and applies the remote mask (M1) to the output image (O1).

In one or more embodiments, the masking engine (110) may create the remote mask (M1) by emphasizing pixels of the remote composite image (A1) that correspond to foreground content of the remote AR workspace.

In one or more embodiments, the masking engine (110) may apply the remote mask (M1) to the output image (O1) to generate the masked output image (MO1) in which the projector image (P1), containing the foreground content of the remote AR workspace, is eliminated from the output image (O1). By eliminating the projector image (P1) that is captured in the input image, the masking engine (110) advantageously prevents the system (100) from interpreting the projection of foreground content from a remote workstation (i.e., the projector image) as foreground content of the local AR workspace.

In one or more embodiments, "eliminate" means to remove the masked portion of the masked image from consideration. The masked portion may be deleted or may be set to a predetermined color or pixel value that the system (100) is configured to ignore. However, one of ordinary skill in the art will appreciate that the masking engine (110) is not particularly limited to these implementations.

The system (100) may include the display engine (112). The display engine (112) may be implemented in hardware (i.e., circuitry), software (e.g., executed in CPU, GPU, FPGA), or any combination thereof. The display engine (112) generates, using one or more lights, effects, and/or images, a projection of the projector image (P1) in the AR workspace.

In one or more embodiments, the display engine (112) may create the projector image (P1) by transforming the remote composite image (A1) from the shared coordinate space to the projector coordinate space.

The display engine (112) may include a 2-dimensional and/or 3-dimensional projector (e.g., a projector (LED, LCD, DLP, laser-based, etc.), a combination of one or more projectors) that is able to project a digital image onto the AR workspace. The display engine (112) may operate in visible and/or non-visible wavelength regimes (e.g., ultraviolet, visible, near infrared, infrared). Therefore, the color, texture, or appearance of the AR workspace and the working region is not limited because the display engine (112) can compensate by using predetermined colors or patterns to make the projector image (P1) perceptible in the AR workspace.

In addition, the display engine (112) may connect to one or more remote workstations (e.g., using a communication transceiver connected to a wireless or wired network) to send the output image (O1) and/or masked output image (MO1) that is shared with a collaborating AR workspace. The display engine (112) may continuously send images. The display engine (112) may send images at predetermined intervals, in response to predetermined conditions, upon user request, or any combination thereof.

Although the system (100) is shown as having six components (102, 104, 106, 108, 110, and 112), in other embodiments of the invention, the system (100) may have more or fewer components. Furthermore, the functionality of each component described above may be shared among multiple components or performed by other components entirely. In addition, each component (102, 104, 106, 108, 110, and 112), may be utilized multiple times in serial or parallel to carry out an iterative operation.

By utilizing the above described engines, the system (100) can dynamically respond to stable changes in the AR workspace. Stable changes in the AR workspace may result from the real-world interactions with the AR workspace (e.g., user marking a document in the AR workspace or the AR workspace itself) or may result from virtual interactions with the AR workspace (e.g., dynamic changes in the projector image (P1) that is projected into the AR workspace).

In one or more embodiments, the system (100) advantageously ignores the changes in the AR workspace that are caused by virtual interactions of the system (100) interacting with the AR workspace (e.g., projecting remote content into the working region). In this manner, the system (100) advantageously not create a visual echo between the collaborating AR workspaces.

In addition, by creating the masked output image (MO1) a single time, at the local AR workspace, the system (100) conserves the resources (e.g., memory, processing power, communications bandwidth of one or more remote workstations) by not requiring the same processes to be repeated at each collaborator's AR workspace. Furthermore, the system (100) conserves resources by transmitting the output data (e.g., output image (O1), masked output image (MO1)), which utilizes fewer resources than the unfiltered an unprocessed images of the AR workspace.

Figure 2:
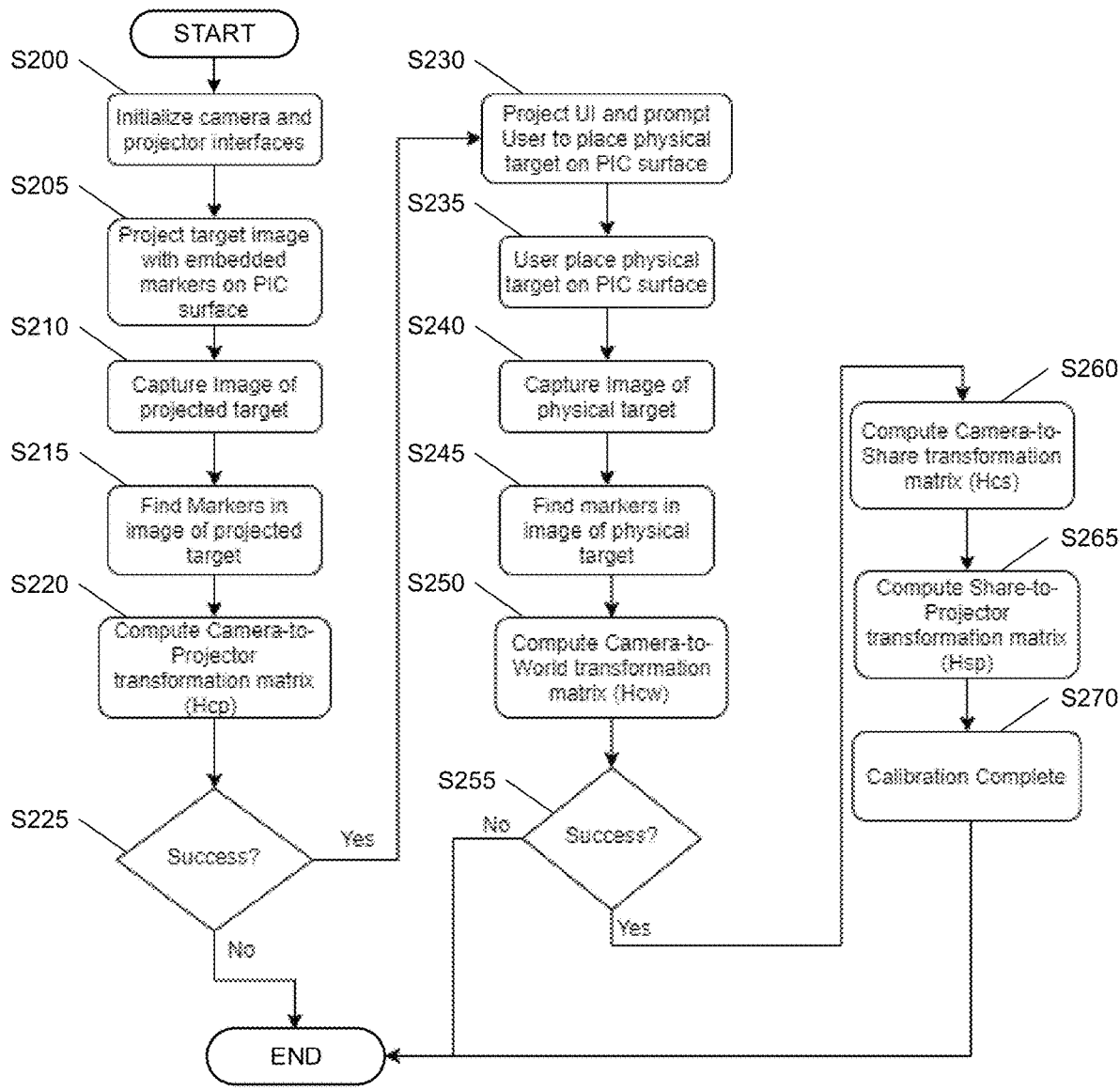
FIG. 2 shows a flowchart of a calibration method in accordance with one or more embodiments of the invention.

FIG. 2 shows a flowchart of a calibration method in accordance with one or more embodiments of the invention. One or more of the individual processes in FIG. 2 may be performed by the system (100) of FIG. 1, as described above. One or more of the individual processes shown in FIG. 2 may be omitted, repeated, and/or performed in a different order than the order shown in FIG. 2. Accordingly, the scope of the invention should not be limited by the specific arrangement as depicted in FIG. 2.

At S200, imaging engine (104) and display engine (112) initialize a camera and a projector of the system (100). In other words, interfaces of the camera and the projector acquire the necessary power, permissions, and/or information necessary to acquire images from the AR workspace and project images into the AR workspace, respectively. The camera and the projector may be components of a PIC device.

At S205, the display engine (112) cause the projector to project a target image with embedded markers into the AR workspace (e.g., a working region of the AR workspace, the PIC device surface). The embedded markers may be any pattern or image that can be identified by the parsing engine (106). For example, an embedded marker may be an ArUco marker, described in further detail with respect to FIG. 8. While not explicitly shown in FIG. 1, the target image may be stored in the buffer (102).

At S210, the imaging engine (104) cause the camera to capture an image (i.e., a first calibration image) of the AR workspace that includes the projection of the target image. While not explicitly shown in FIG. 1, the first calibration image may be stored in the buffer (102).

At S215, the parsing engine (106) finds the embedded markers in the first calibration captured image. The parsing engine (106) may perform optical character recognition (OCR), pattern recognition, object recognition, and/or any appropriate content analysis to identify and locate the embedded markers.

At S220, the transformation engine (108) computes a camera-to-projector transformation (Hcp) based on the known locations of the embedded markers in the target image (i.e., in a projector coordinate space) and recognized coordinates of the embedded markers in the first calibration image (i.e., in a camera coordinate space). The camera-to-projector transformation (Hcp) defines a relationship between the camera coordinate space and the projector coordinate space. The camera-to-projector transformation (Hcp) may be saved in the transformation set (H) stored in the buffer (102).

At S225, the transformation engine (108) determines whether the camera-to-projector transformation (Hcp) was successfully computed. If the determination at S225 is YES, the calibration process continues on to S230, described below. If the determination at S225 is NO, the calibration process is ended. The system (100) may shut down, restart the calibration process at any appropriate point, display a warning, prompt a user for input, or any combination thereof.

At S230, the display engine (112) projects a user interface (UI) into the AR workspace and prompts the user to place a physical target in the AR workspace (e.g., on the PIC surface). The physical target may be any object (e.g., a piece of standard size paper), with markers places at known locations or with known distances between pairs of markers. For example, the physical target may be a piece of paper used during the collaboration session, as described in further detail with respect to FIG. 9.

At S235, the user places the physical target in the AR workspace (e.g., on the PIC surface).

At S240, the imaging engine (104) causes the camera to capture an image (i.e., a second calibration image) of the AR workspace that includes the physical target. While not explicitly shown in FIG. 1, the second calibration image may be stored in the buffer (102) and/or may replace a previous second calibration images stored in the buffer (102). The second calibration image may be captured from the physical target during every calibration process, as the physical target may change.

At S245, the parsing engine (106) finds markers in the second calibration image of the physical target. The markers may be any pattern or image that can be identified by the parsing engine (106). Alternatively, the markers may be dimensions of the physical target. Information about the markers (e.g., overall physical dimensions, distances between extremities of the physical target, distances between one or more markers) may be loaded from the buffer (102) for known calibration objects, recorded into the system (100) by the user for an unrecognized object, directly computed by the parsing engine (106), or any combination thereof.

Furthermore, the transformation engine (108) may compute a projector-to-world transformation (Hpw) based on the locations of the markers in the second calibration image (i.e., in the camera coordinate space) and the relationship between the physical markers and the embedded markers from the projected target image (i.e., in a physical coordinate space of the AR workspace). The projector-to-world transformation (Hpw) defines a relationship between the projector coordinate space and the physical coordinate space of the AR workspace. The projector-to-world transformation (Hpw) may be saved in the transformation set (H) stored in the buffer (102).

At S250, the transformation engine (108) computes a camera-to-world transformation (Hcw) by combining the camera-to-projector transformation (Hcp) from S220 and the projector-to-world transformation (Hpw) from S245. Therefore, the camera-to-world transformation (Hcw) defines a relationship between the camera coordinate space and the physical coordinate space of the AR workspace. The camera-to-world transformation (Hcw) may be saved in the transformation set (H) stored in the buffer (102).

At S255, the transformation engine (108) determines whether the camera-to-world transformation (Hcw) was successfully computed. If the determination at S255 is YES, the calibration process continues on to S260, described below. If the determination at S255 is NO, the calibration process is ended. The system (100) may shut down, restart the calibration process at any appropriate point, display a warning, prompt a user for input, or any combination thereof.

At S260, the transformation engine (108) computes a camera-to-shared space transformation (Hcs) that defines a relationship between the camera coordinate space and the shared coordinate space used by the AR workspace. The camera-to-shared space transformation (Hcs) may be saved in the transformation set (H) stored in the buffer (102).

At S265, the transformation engine (108) computes a shared space-to-projector transformation (Hsp) that defines a relationship between the shared coordinate space used by the AR workspace and the projector coordinate space. The shared space-to-projector transformation (Hsp) may be saved in the transformation set (H) stored in the buffer (102).

At S270, the calibration process is complete once the transformation set includes at least the above described transformations (Hcp, Hcw, Hcs, and Hsp). After S270, the calibration process is ended. The system (100) may proceed with performing the methods of FIGS. 3A-3B.

Figure 3A:
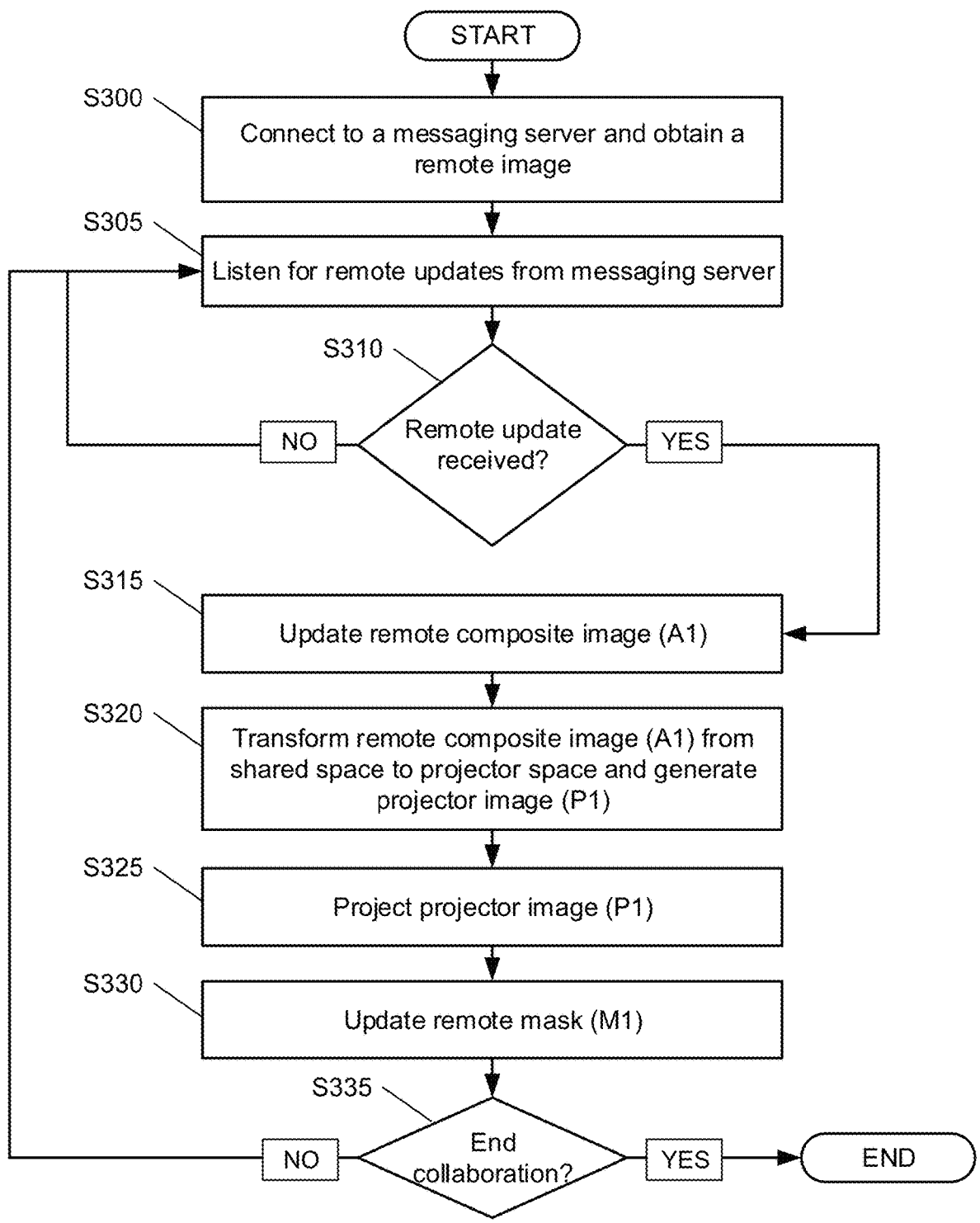
FIGS. 3A-3B show flowcharts of methods in accordance with one or more embodiments of the invention.
Figure 3B:
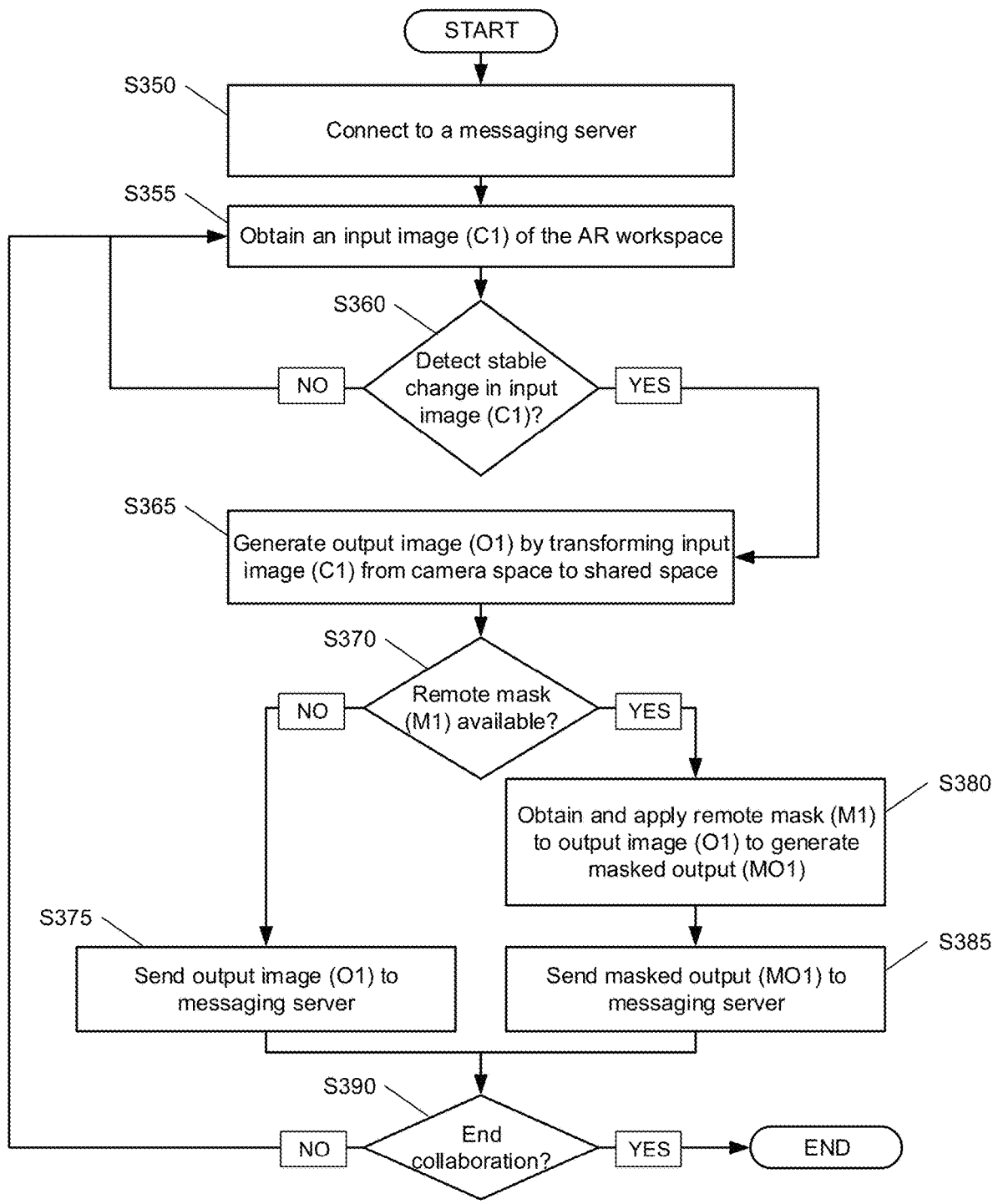

FIGS. 3A-3B show flowcharts of methods of projecting a projector image (P1) and masking an output image (O1) in accordance with one or more embodiments of the invention. One or more of the processes in FIGS. 3A-3B may be performed by the system (100) of FIG. 1, as described above. Because a collaboration between two AR workspaces (i.e., a first AR workspace with a system (100) and a second AR workspace with a system (100')) requires repeated exchange of information during a collaboration session, as shown below in FIGS. 4A-4B, one of ordinary skill in the art will appreciate that the individual processes described in FIGS. 3A-3B may be performed in a different order than the order shown in FIGS. 3A-3B, prioritized, paused, interrupted, omitted, and/or repeated. Accordingly, the scope of the invention should not be limited by the specific arrangement as depicted in FIGS. 3A-3B.

As discussed above, FIG. 3A shows a flowchart of a method of projecting a projector image (P1) in accordance with one or more embodiments of the invention. At S300, the system (100) in the AR workspace (i.e., a first AR workspace) connects to a messaging server and obtains a remote composite image (A1).

The messaging server may be a system (100') of a collaborating AR workspace (i.e., a second AR workspace), a server that is connected to, but separate from, the second AR workspace, a server that is connected to a plurality of remote workstations (i.e., a plurality of systems (100') of a plurality of second AR workspaces), or any appropriate device that facilitates the collaboration session by exchanging information between different AR workspaces.

As discussed above, the remote composite image (A1) may be a single image of foreground content in the second AR workspace (100') that is formatted in the shared coordinate space. In one or more embodiments, the messaging server may generate a remote composite image (A1) that is a composition of multiple images from the second AR workspace (100') (e.g., when communications are paused, delayed, or interrupted and multiple images are acquired by the second AR workspace before being received by the first AR workspace).

In one or more embodiments, the second AR workspace includes a plurality of remote workstations that each output a remote image formatted in the shared coordinate space. The system (100) may obtain the plurality of remote images from the messaging server and merge the plurality of remote images into the remote composite image (A1). Alternatively, the messaging server or any one of the remote workstations may conserve resources (e.g., communication bandwidth, processing power, storage memory) by merging the plurality of the remote images into the remote composite image (A1) before transmission to the system (100). Merging multiple images is discussed below, with respect to the example shown in FIGS. 4A-4B.

At S305, the system (100) listens for remote updates from the messaging server. To ensure all information from the second AR workspace is current, the system may continuously listen for additional remote images or updated remote composite images (A1). In other embodiments, the system (100) listens for updates at predetermined intervals, in response to predetermined conditions, upon user request, or any combination thereof.

At S310, the system (100) determines if a remote update (e.g., a new remote image, an updated remote composite image (A1)) has been received from the messaging server. If the determination at S310 is YES, the projection process continues on to S315. If the determination at S310 is NO, the system (100) returns to S305 and listens for a remote update.

At S315, the system (100) updates the remote composite image (A1) based on the remote update received from the messaging server. In one or more embodiments, the system (100) may merge one or more remote images into a previously-stored remote composite image (A1) by applying the minimum operator. In other embodiments, the system (100) may simply replace the previously-stored remote composite image (A1) with a more current version received in the remote update.

At S320, the system (100) generates a projector image (P1) by applying the shared space-to-projector transformation (Hsp) to the updated remote composite image (A1). By transforming the updated remote composite image (A1) from the shared coordinate space to the projector coordinate space, the foreground content of the second AR workspace is aligned and with the specific coordinate systems of the first AR workspace.

At S325, the system (100) projects the projector image (P1) into the first AR workspace. The composite foreground content of the second AR workspace is aligned with physical coordinate space and the foreground content of the first AR workspace, allowing the user to efficiently collaborate with the remote users.

At S330, the system (100) obtains and/or updates a remote mask (M1) based on the remote composite image (A1). As discussed above, the remote mask (M1) is a filter that differentiates between foreground content and background content of the AR workspace. The virtual content that is projected into the first AR workspace (i.e., projector image (P1) based on the remote composite image (A1)) is considered background content because the virtual content is not part of the user's contribution to the collaboration session. Accordingly, the pixels of the remote mask (M1) are set to eliminate the content of corresponding pixels in the remote composite image (A1). In this way, the remote mask (M1) can remove the projector image (P1) from a captured image of the first AR workspace, as described in further detail below with respect to FIG. 3B.

At S335, the system (100) determines if the collaboration is ending. If the determination at S335 is YES, the projection process is ended. If the determination at S335 is NO, the system returns to S305 and listens for another remote update.

In one or more embodiments, after completing the projection process described in FIG. 3A, the system (100) has acquired and projected virtual content (i.e., projector image (P1)), based on images from the second AR workspace (i.e., remote composite image (A1)), into the first AR workspace. The system (100) has also obtained or updated a remote mask (M1) of the projected virtual content that can be used to differentiate foreground content from background content in the first AR workspace. By using the transformations in the transformation set (H), the system (100) has advantageously ensured proper alignment between the standardized shared coordinate space and the specific environment of the first AR workspace.

As discussed above, FIG. 3B shows a flowchart of a method of masking an output image (O1) in accordance with one or more embodiments of the invention. At S350, the system (100) in the first AR workspace connects to the messaging server.

As discussed above, the messaging server may be a system (100') of the collaborating second AR workspace, a server that is connected to, but separate from, the second AR workspace, a server that is connected to a plurality of remote workstations (i.e., a plurality of systems (100') of a plurality of second AR workspaces), or any appropriate device that facilitates the collaboration session by exchanging information between different AR workspaces.

At S355, the system (100) obtains an input image (C1) of the first AR workspace. For example, the imaging engine (104) may use a camera to capture the input image (C1).

At S360, the system (100) determines if a stable change is present in the input image (C1). As discussed above, a stable change is any change that may be identified by the parsing engine (106) using optical character recognition (OCR), pattern recognition, object recognition, and/or any appropriate content analysis method. The stable change may be relative to a calibration image or relative to the last input image (C1) stored in the buffer (102).

If the determination at S360 is YES, the masking process continues on to S365. If the determination at S360 is NO, the system (100) returns to S355 and obtains a new input image (C1).

At S365, the system (100) generates an output image (O1) by applying the camera-to-shared space transformation (Hcs) to the input image (C1). By transforming the input image (C1) from the camera coordinate space to the shared coordinate space, the content captured in the image of the first AR workspace is aligned and with the shared coordinate system used by the second AR workspace.

At S370, the system (100) determines whether a remote mask (M1) is available. If the determination at S370 is YES (e.g., the system (100) has received and processed remote updates from the messaging server), the masking process continues on to 380, described in further detail below. If the determination at S370 is NO (e.g., the projection process of FIG. 3A has been completed), the masking process continues on to S375.

At S375, the system (100) sends the output image (O1) to the messaging server. Because the determination at S370 was NO (e.g., a remote mask (M1) is not available because the system (100) has not yet received remote updates from the messaging server), there may only be local content in the output image (O1). Accordingly, the output image (O1) is shared with the second AR workspace to allow collaborating user to see the local content of the first AR workspace. In other words, a system (100') in a second AR workspace may obtain the output image (O1) as its own remote composite image (A2), as described in further detail below with respect to the example shown in FIGS. 4A-4B.

At S380, the system (100) generates a masked output image (MO1) by obtaining and applying a remote mask (M1) to the output image (O1). While the output image (O1) contains both local (e.g., marking and content created or changed in the first AR workspace by the user) and remote content (e.g., the virtual content of projected image (P1) that was projected into the first AR workspace), the masked output image (MO1) contains only the local content after applying the remote mask (M1).

At S385, the system (100) sends the masked output image (MO1) to the messaging server. Because the remote content of the first AR workspace has been "masked" out by applying the remote mask (M1), the masked output image (O1) is shared with the second AR workspace to allow collaborating user to see only the local content of the first AR workspace. In other words, a system (100') in a second AR workspace may obtain the masked output image (MO1) as its own remote composite image (A2), as described in further detail below with respect to the example shown in FIGS. 4A-4B.

At S390, the system (100) determines if the collaboration is ending. If the determination at S390 is NO, the system (100) returns to S355 and obtains another input image (C1). If the determination at S390 is YES, the masking process is ended.

In one or more embodiments, after completing the masking process described in FIG. 3B, the system (100) has captured an image (i.e., input image (C1)) of the first AR workspace that has a recognized stable change. The system (100) has also converted the captured image into a standardized output image that is shared with the second AR workspace after masking out any virtual content (i.e., applying remote mask (M1) to remove a projected image (P1)). By using masking, the captured image to eliminate virtual content of the first AR workspace, the system (100) has advantageously ensured that data shared with the second AR workspace only includes local foreground content of the first AR workspace. Furthermore, by using the transformations in the transformation set (H), the system (100) has advantageously ensured that the shared foreground content is preserved and aligned with the shared coordinate space such that is may be transformed when projected into the specific environment of the second AR workspace.

To facilitate a smooth collaboration session, in one or more embodiments, the system (100) may perform one or more of the processes in the projection method shown in FIG. 3A and the masking method shown in FIG. 3B in parallel. By coordinating the various processes, each AR workspace can with the most recent input from the other AR workspace and filter the appropriate virtual content to prevent a visual echo from propagating during the exchange of information.

In addition, once the collaboration session has been ended by any AR workstation (or at anytime a user wishes to save the current status of the collaboration session), a collaboration image may be generated by merging the masked output image (MO1) and the remote composite image (A1). The collaboration image may be formatted in the shared coordinate space and may be saved in the buffer (102) in any imaging format (e.g., a JPEG image, a GIF image, a bitmap image, a TIFF image, a PDF document). Furthermore, the collaboration image may be sent to any user in the collaboration session (e.g., in the first AR workspace and/or the second AR workspace).

Figure 4A:
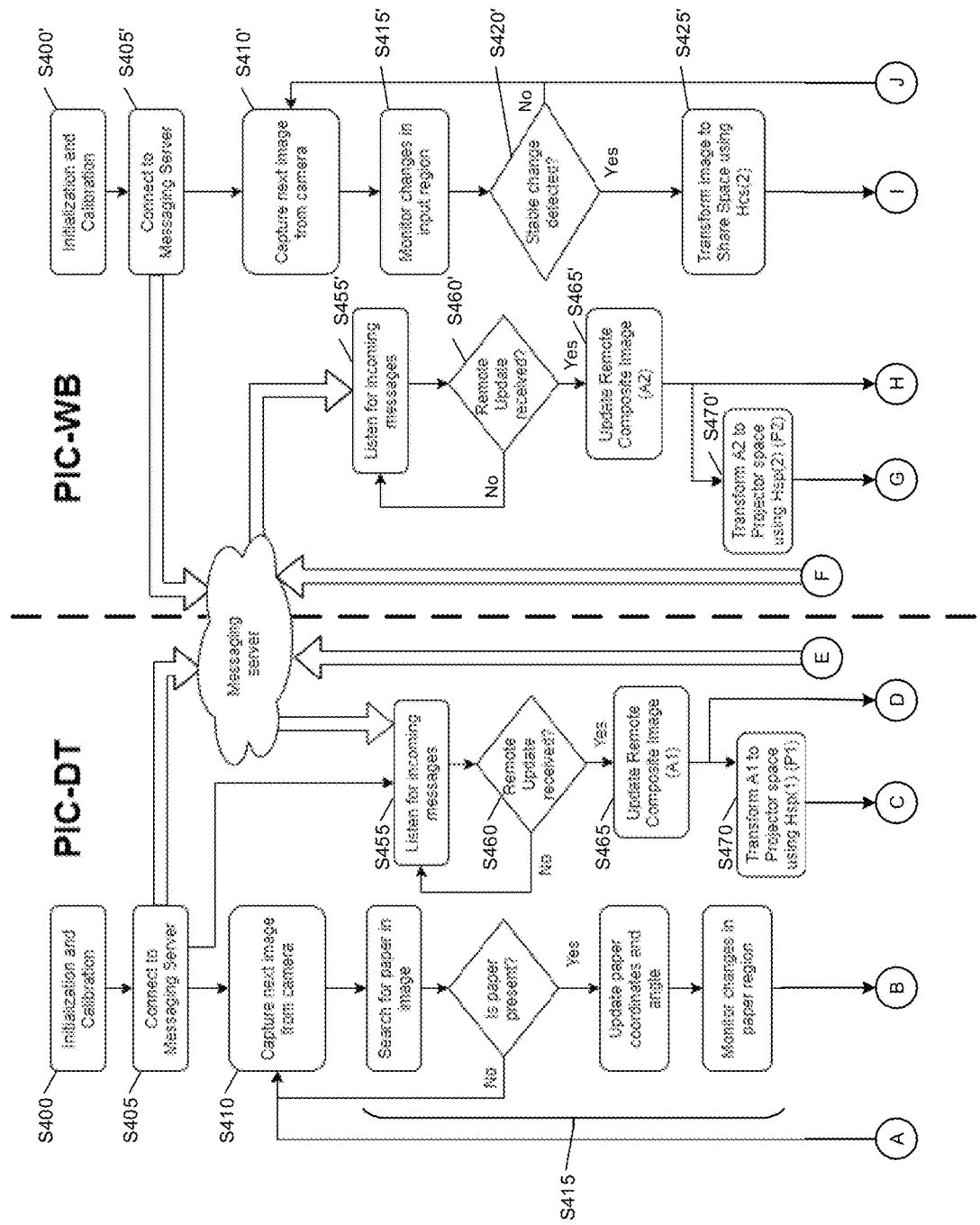
FIGS. 4A-4B show an implementation example of the methods of FIGS. 3A-3B in accordance with one or more embodiments of the invention.
Figure 4B:
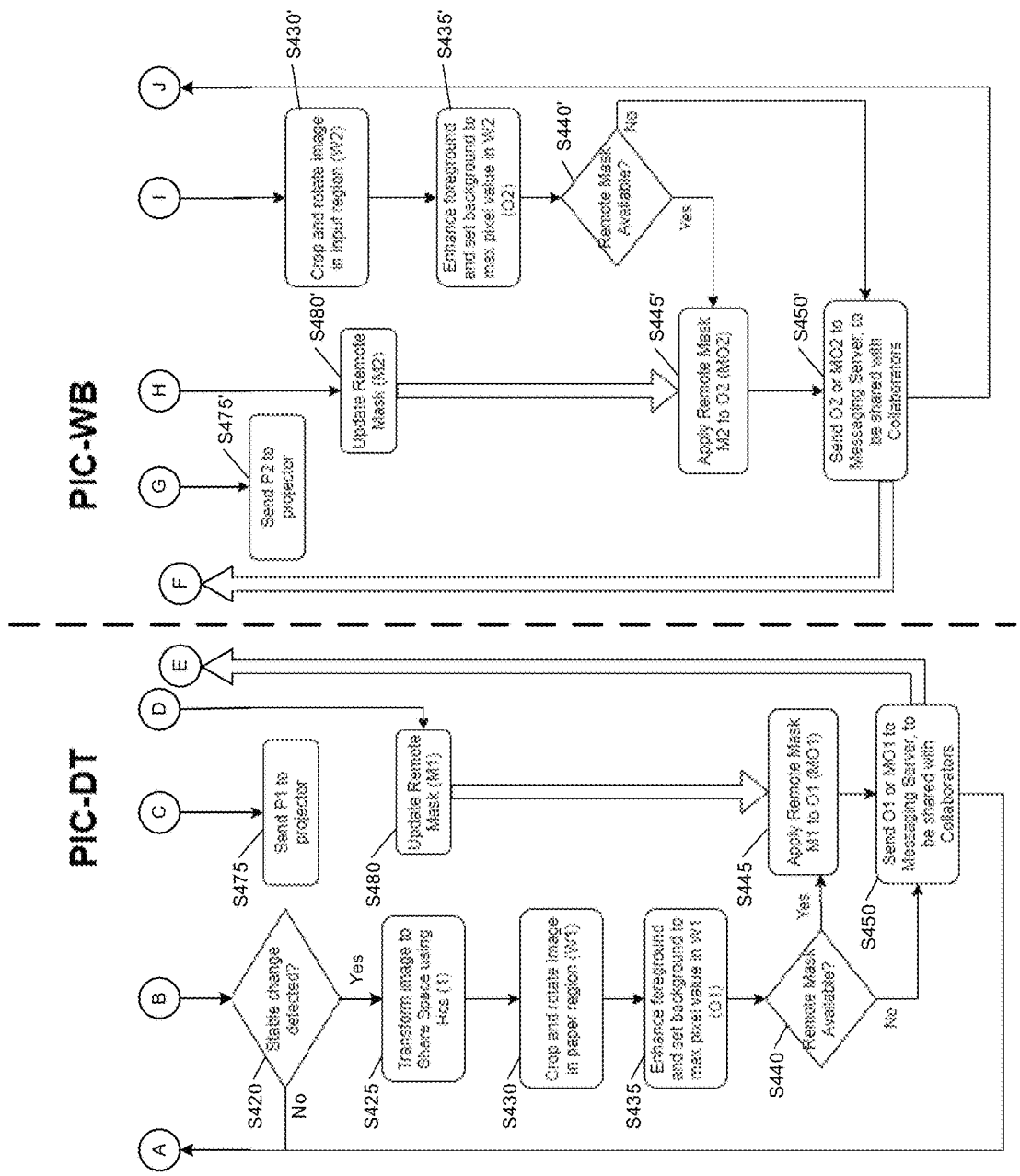

FIGS. 4A-4B show an implementation example of the methods of FIGS. 3A-3B in accordance with one or more embodiments of the invention. In one or more embodiments of the invention, the first AR workspace includes a first PIC device (i.e., PIC-DT operated by User 1) that is oriented with respect to a piece of paper on a desktop (i.e., the working region of the first AR workspace) and the second AR workspace includes a second PIC device (i.e., PIC-WB operated by User 2) that is oriented with respect to a whiteboard (i.e., the working region of the second AR workspace).

The PIC-DT and PIC-WB may be identical PIC devices that are configured to parse different working regions. Alternatively, the PIC-DT and the PIC-WB may be different PIC devices with equipment that is specialized for the particular working region being used. For example, the two PIC device may require different resolution cameras of projectors to accommodate the different sizes of the working regions. In another example, the software of the PIC devices may be different to accommodate different background surfaces (e.g., a white piece of paper, a colored piece of paper, a whiteboard, a blackboard, etc.).

At S400 and S400', the PIC-DT and the PIC-WB initialize and calibrate to the specific parameters of the first and second AR workspaces, respectively. In one or more embodiments, each PIC device performs the calibration process described in FIG. 2 and generates a transformation set (H, H') that is unique to each AR workspace. For example, the shared space-to-projector transformation (Hsp1) of the PIC-DT will be different from the shared space-to-projector transformation (Hsp2) of the PIC-WB because the working regions (i.e., the piece of paper in the first AR workspace and the whiteboard in the second AR workspace) are different sizes. Similarly, the other transformations in the transformation sets (H, H') of the PIC devices may differ based on the specific equipment in use (e.g., camera and projector) and the geometry of the first and second AR workspaces.

At S405 and S405', the PIC-DT and the PIC-WB connect to a messaging server that facilitates the exchange of information between the PIC-DT and the PIC-WB. The messaging server may be implemented in hardware (i.e., circuitry), software (e.g., executed in CPU, GPU, FPGA), or any combination thereof. While FIG. 4A depicts the PIC-DT and the PIC-WB exchanging information and data by way of an independent messaging server device, one of ordinary skill in the art will appreciate that the PIC-DT and the PIC-WB may directly communicate with each other (e.g., the messaging server may be another engine of system (100)).

For simplicity, the remaining processes will be described in a sequential order that may occur during a collaboration between the PIC-DT and the PIC-WB. Specifically, the remaining processes are grouped into three sequential "Rounds" that characterize the interaction between the PIC-DT and PIC-WB. However, one or more of the individual processes shown in FIGS. 4A-4B and/or described below may be omitted, repeated, and/or performed in a different order than the order shown in FIGS. 4A-4B or the following description. In one or more embodiments, one or more of the individual processes may be performed simultaneously or asynchronously on the PIC-DT and the PIC-WB to improve coordination during the collaboration session. Accordingly, the scope of the invention should not be limited by the specific arrangement as depicted in FIGS. 4A-4B.

Round 1—PIC-DT to PIC-WB

At S410, the PIC-DT captures an input image (C1) of the first AR workspace using a camera. The input image (C1) may include the piece of paper that User 1 has placed in the first AR workspace as the working region.

At S415, the PIC-DT performs a series of processes to monitor for changes in the paper region (i.e., changes to the paper during the collaboration session).

The PIC-DT may search for the paper in the input image (C1). If the PIC-DT determines that the paper is not present or is not recognized in the input image (C1), the PIC-DT returns to S410 to acquire a next input image (C1) before searching again. If the PIC-DT determines that the paper is present and recognized in the input image (C1), the PIC-DT records or updates the coordinates and orientation (i.e., angle) of the piece of paper. The PIC-DT then monitors the paper region for a stable change, as discussed above.

Continuing along Path B to FIG. 4B, at S420, the PIC-DT determines whether a stable change has been detected in the paper region. If the determination at S420 is NO, the process returns to S410 (along Path A) to acquire a next input image (C1). If the determination at S420 is YES, the process continues on to S425.

At S425, the PIC-DT transforms the input image (C1) into the shared coordinate space by applying the camera-to-shared space transformation (Hcs1). Applying the transformation (Hcs1), may produce an intermediate image (W1).

At S430, the portion of the intermediate image (W1) that corresponds to the paper region is rotated, cropped, and scaled to create an upright version of the paper region in the shared coordinate space (e.g., not skewed by the perspective of the camera of PIC-DT).

At S435, the PIC-DT performs a series of additional image processing operations resulting in an output image (O1). In one or more embodiments, the additional image processing operations may set all background pixel (e.g., pixels that correspond to the background of the paper, pixels not related to the detected stable change) to a predetermined value, while the foreground pixels (e.g., pixels that correspond to User 1 input, pixels related to the detect stable change) are preserved and/or enhanced (e.g., smoothed, color balanced, scaled, etc.). The predetermined value of the background pixels may depend on the AR workspace. For example, with a white piece of paper, the predetermined value may be an RGB pixel value of (255, 255, and 255) to create a perfectly white background in the output image (O1) that enhances the appearance of the foreground pixels. In another example using a black piece of paper, the predetermined value may be an RGB pixel value of (0, 0, 0) to create a perfectly black background in the output image (O1).

In one or more embodiments, the image processing operations of S430 and S435 may be applied before or after applying the transformation (Hcs1) of S425. Accordingly, the output image (O1) may be produced directly from input image (C1).

At S440, the PIC-DT determines whether a remote mask (M1) is available. If the determination at S440 is YES, the process continues on to S445, as described in Round 3 below. If the determination at S440 is NO, the process continues on to S450.

At S450, the PIC-DT sends the output image (O1) to the messaging server which shares the image with PIC-WB and/or any other participants in the collaboration session.

Round 2—PIC-WB to PIC-DT

Back in FIG. 4A, at S455', the PIC-WB listens for incoming messages (e.g., remote updates from other collaborators) from the messaging server.

At S460', the PIC-WB determines whether a remote update (e.g., an output image (O1) or masked output image (MO1) from PIC-DT) has been received. If the determination at S460' is NO, the processes returns to S455' where the PIC-WB listens for a next incoming message. If the determination at S460' is YES, the process continues on to S465'.

At S465', the PIC-WB creates or updates a remote composite image (A2) with the information in the received remote update. For example, in the first exchange with a single collaborator (i.e., the PIC-DT), the PIC-WB may create the remote composite image (A2) directly from the output image (O1). In subsequent exchanges, the PIC-WB may update the remote composite image (A2) based on difference between the latest and previously received output images (O1).

In another example where PIC-WB is collaborating with multiple remote workstations, the PIC-WB may merge all of the received output images (O1, O3, O4, etc.) to account for inputs from multiple collaborators at once. The received output images may be aligned and centered. When a pixel is designated as foreground in more than one of the received output images (i.e., when multiple collaborators edit the same space at the same time) the final value of that pixel may be determined in a number of different ways. As discussed above, in one or more embodiments, a minimum operator may be applied to identify the pixel value with the highest contrast with the background pixels. In one or more other embodiments, the pixel value with the most recent change (e.g., sorted timestamps) may be used in the remote composite image (A2).

The remote composite image (A2) is utilized in at both S470' and S480', described below.

At S470', the PIC-WB generates a projector image (P2) by applying the shared space-to-projector transformation (Hsp2) to the remote composite image (A2).

Continuing along Path G from S470' in FIG. 4A to S475' in FIG. 4B, the PIC-WB sends projector image (P2) to the projector for projection into the second AR workspace (i.e., onto the working region of the whiteboard).

Continuing along Path H from S465' in FIG. 4A to S480' in FIG. 4B, the PIC-WB creates or updates a remote mask (M2) based on the remote composite image (A2). For example, in the first exchange with a single collaborator (i.e., the PIC-DT), the PIC-WB may create the remote mask (M2) directly from remote composite image (A2) by setting background pixels to 0 (i.e., off) and setting foreground pixels to 255 (i.e., on). In subsequent exchanges, the PIC-WB may update the remote mask (M2) based on differences in subsequent remote composite images (A2).

Back in FIG. 4A, at S410', the PIC-WB captures an input image (C2) of the second AR workspace using a camera. The input image (C2) includes the working region of the whiteboard in the second AR workspace, including the projection of projector image (P2) from S470', above.

At S415', the PIC-WB monitors for changes in the working region of the whiteboard (i.e., changes to the whiteboard during the collaboration session).

At S420', the PIC-WB determines whether a stable change has been detected in the working region of the whiteboard. If the determination at S420' is NO, the process returns to S410' to acquire a next input image (C2). If the determination at S420' is YES, the process continues on to S425'.

At S425', the PIC-WB transforms the input image (C2) into the shared coordinate space by applying the camera-to-shared space transformation (Hcs2). Applying the transformation (Hcs2), may produce an intermediate image (W2). Note that the transformations (Hcs1, Hcs2) are specific to each PIC device and each AR workspace.

Continuing along Path I to FIG. 4B, at S430', the portion of the intermediate image (W2) that corresponds to the working region of the whiteboard is rotated, cropped, and scaled to create an upright version of the working region of the whiteboard in the shared coordinate space (e.g., not skewed by the perspective of the camera of PIC-WB).

At S435', the PIC-WB performs a series of additional image processing operations resulting in an output image (O2). In one or more embodiments, the additional of image processing operations may set all background pixel (e.g., pixels that correspond to the background of the whiteboard, pixels not related to the detected stable change) to a predetermined value, while the foreground pixels (e.g., pixels that correspond to User 2 input, pixels related to the detect stable change) are preserved and/or enhanced (e.g., smoothed, color balanced, scaled, etc.). The predetermined value of the background pixels may depend on the AR workspace. For example, with a whiteboard, the predetermined value may be an RGB pixel value of (255, 255, 255) to create a perfectly white background in the output image (O2) that enhances the appearance of colored whiteboard markers. In another example using a blackboard, the predetermined value may be an RGB pixel value of (0, 0, 0) to create a perfectly black background in the output image (O2) that contrast with chalk markings.

In one or more embodiments, the image processing operations of S430' and S435' may be applied before or after applying the transformation (Hcs2) of S425'. Accordingly, the output image (O2) may be produced directly from input image (C2).

At S440', the PIC-WB determines whether a remote mask (M2) is available. If the determination at S440' is YES (e.g., the remote mask (M2) is retrieved from process S480'), the process continues on to S445', as described below. If the determination at S440 is NO, the process continues on to S450', as described below.

At S445', PIC-WB generates a masked output image (MO2) by applying the remote mask (M2) to the output image (O2). The PIC-WB aligns the remote mask (M2) with the output image (O2) (e.g., at their centers or any other appropriate reference point), and sets pixels in the masked output image (MO2) to emphasize the foreground pixels of the second AR workspace based on the remote mask (M2). Note that output image (O2) contains both local content (i.e., foreground content corresponding to the interactions of User 2 with the second AR workspace) and remote content (i.e., background content corresponding to the background of the second AR workspace and the virtual content of projector image (P2) that is projected into the second AR workspace). On the other hand, masked output image (MO2) may contain only the local content after applying the remote mask (M2).

At S450', the PIC-WB sends the masked output image (MO2) to the messaging server which shares the image with PIC-DT and/or any other participants in the collaboration session. Alternatively, if the output image (O2) is not masked, the PIC-WB may directly send the output image (O2) to the messaging server.

Round 3—PIC-DT to PIC-WB

Back in FIG. 4A, at S455, the PIC-DT listens for incoming messages (e.g., remote updates from other collaborators) from the messaging server.

At S460, the PIC-DT determines whether a remote update (e.g., an output image (O2) or masked output image (MO2) from PIC-WB) has been received. If the determination at S460 is NO, the processes returns to S455 where the PIC-DT listens for a next incoming message. If the determination at S460 is YES, the process continues on to S465.

At S465, the PIC-DT creates or updates a remote composite image (A1) with the information in the received remote update. For example, in the first exchange with a single collaborator (i.e., the PIC-WB), the PIC-DT may create the remote composite image (A1) directly from the output image (O2) or the masked output image (O2). In subsequent exchanges, the PIC-DT may update the remote composite image (A1) based on difference between the latest and previously received output images (O2, MO2).

In another example where PIC-DT is collaborating with multiple remote workstations, the PIC-DT may merge all of the received output images (O2, O3, O4, etc.) to account for inputs from multiple collaborators at once. The received output images may be aligned and centered. When a pixel is designated as foreground in more than one of the received output images (i.e., when multiple collaborators edit the same space at the same time) the final value of that pixel may be determined in a number of different ways. As discussed above, in one or more embodiments, a minimum operator may be applied to identify the pixel value with the highest contrast with the background pixels. In one or more other embodiments, the pixel value with the most recent change (e.g., sorted timestamps) may be used in the remote composite image (A1).

The remote composite image (A1) is utilized in at both S470 and S480, described below.

At S470, the PIC-DT generates a projector image (P1) by applying the shared space-to-projector transformation (Hsp1) to the remote composite image (A1). Note that PIC-DT may track the position of the paper region in the first AR workspace and update the shared space-to-projector transformation (Hsp1) to account for User 1 moving the piece of paper during the collaboration session.

Continuing along Path C from S470 in FIG. 4A to S475 in FIG. 4B, the PIC-DT sends projector image (P1) to the projector for projection into the first AR workspace (i.e., onto the paper region). Because the transformation (Hsp1) may be updated to account for a new orientation of the paper region, the projector image (P1) will advantageously be aligned with the piece of paper throughout the collaboration session.

Continuing along Path D from S465 in FIG. 4A to S480 in FIG. 4B, the PIC-DT creates or updates a remote mask (M1) based on the remote composite image (A1). For example, in the first exchange with a single collaborator (i.e., the PIC-WB), the PIC-DT may create the remote mask (M1) directly from remote composite image (A1) by setting background pixels to 0 (i.e., off) and setting foreground pixels to 1 or 255 (i.e., on). In subsequent exchanges, the PIC-DT may update the remote mask (M1) based on differences in subsequent remote composite images (A1).

At this stage, the process for PIC-DT may return to 410 and proceeds through to S435 (i.e., the PIC-DT capture a next input image (C1) and transforms the input image (C1) to an output image (O1)). In Round 3, at S440, the PIC-DT determines that a remote mask (M1) is available (i.e., the remote mask (M1) is retrieved from process S480) and the process continues on to S445.

At S445, PIC-DT generates a masked output image (MO1) by applying the remote mask (M1) to the latest output image (O1). The PIC-DT aligns the remote mask (M1) with the latest output image (O1) (e.g., at their centers or any other appropriate reference point), and sets pixels in the masked output image (MO1) to emphasize the foreground pixels of the first AR workspace based on the remote mask (M1). Note that output image (O1) contains both local content (i.e., foreground content corresponding to the interactions of User 1 with the first AR workspace) and remote content (i.e., background content corresponding to the background of the first AR workspace and the virtual content of projector image (P1) that is projected into the first AR workspace). On the other hand, masked output image (MO1) may contain only the local content after applying the remote mask (M1).

At S450, the PIC-DT sends the masked output image (MO1) to the messaging server which shares the image with PIC-WB and/or any other participants in the collaboration session.

Round 2 and Round 3 are repeated until the end of the collaboration session. If User 1 or User 2 wishes to print out or save the results of the collaboration session, a collaboration image is computed by combing remote composite images (A1, A2) and locally captured masked output images (MO1, MO2). In one or more embodiments the merging method described above may be implemented to resolve conflicts between pixels (e.g., minimum operator, timestamp comparison, etc.).

FIGS. 5A-5G show examples of workspaces, images, and a mask in accordance with the implementation example shown in FIGS. 4A-4B.

Figures 5A, 5B:
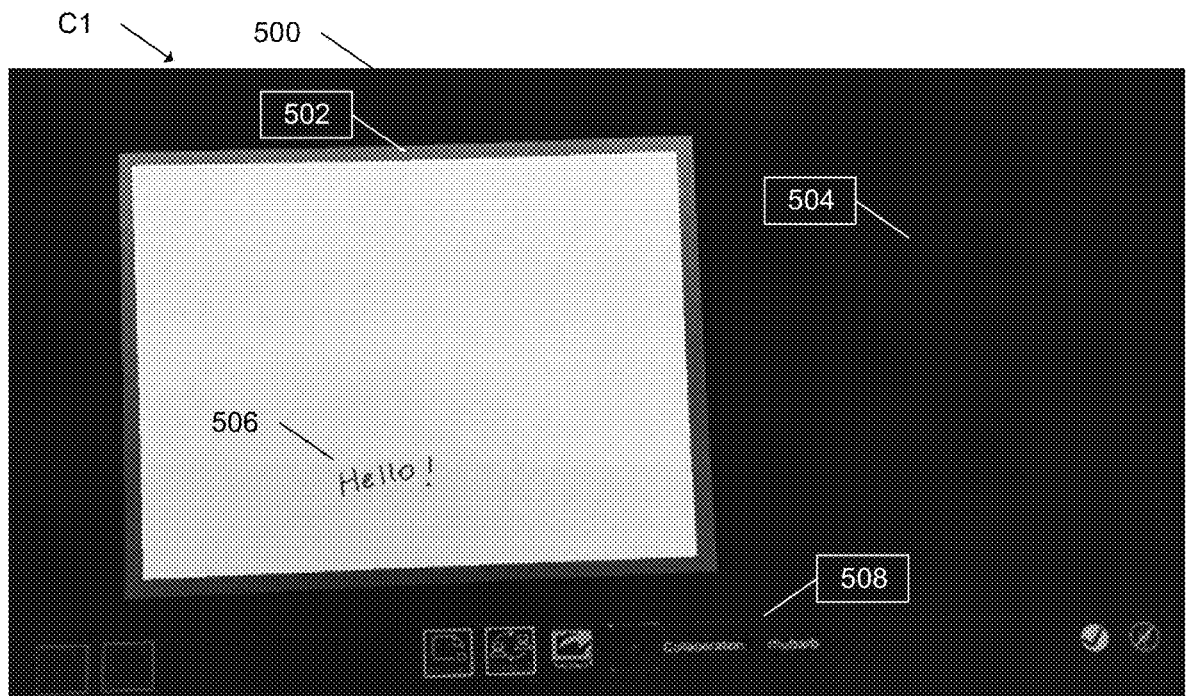
FIGS. 5A-5G show examples of workspaces, images, and a mask in accordance with the implementation example shown in FIGS. 4A-4B.

FIG. 5A shows a raw input image (C1) of the first AR workspace (500), captured by PIC-DT at S410 in Round 1. The first AR workspace (500) includes the piece of paper (502) that defines the working region of the first AR workspace (500) and a dark background (504) surrounding the paper (502).

User 1 has altered the paper (502) with a marking (506) (i.e., a hand written text string) at the start of the collaboration session. It will be appreciated that any new content (e.g., characters, text strings, images, charts, graphics, etc.) that is added to the paper region (e.g., drawn onto the paper (502), permanently or non-temporarily placed on or above the paper (502), etc.) may become foreground content of the first AR workspace (500).

On the other hand, the dark background (504) surrounding the paper (502) may become the background content of the first AR workspace (500). In one or more embodiments, the PIC-DT may project a user interface (508) into the first AR workspace (500). The user interface (508) includes one or more controls for User 1 to control the PIC-DT (e.g., start/pause/stop the collaboration session, email, share, save, print). Because the user interface (508) is virtual content created by the PIC-DT, the user interface (508) is generally part of the background content of the first AR workspace (500). However, in one or more embodiments, the user interface (508) may be designated as foreground content if User 1 wishes to share the information contained in the user interface (508).

FIG. 5B shows a cropped, rotated, scaled, and cleaned output image (O1) of the first AR workspace (500), generated by PIC-DT at S435 in Round 1. When applying the camera-to-shared space transformation (Hcs1) to the input image (C1), the PIC-DT also applies a normalization scheme (i.e., a series image processing operations) that generates the output image (O1) with standard dimensions and a standard resolution in the shared coordinate space.

In one or more embodiments, the standard dimensions are proportional to an area of the working region (i.e., the dimension of the paper (502)) of the first AR workspace (500). However, the standard dimensions may be any appropriate values to facilitate the collaboration session (e.g., a field large enough for User 1 and User 2 to collaborate efficiently, a set of dimensions based on the physical dimensions of the whiteboard in the second AR workspace).

In one or more embodiments, generating the output image (O1) further includes performing one or more image processing operations to enhance contrast between background pixels that correspond to a surface of the working region and foreground pixels that correspond to the foreground content (i.e., marking (506)) in the first AR workspace (500). In other words, after applying the normalization scheme, the PIC-DT may also enhance contrast between background pixels of the output image that correspond to a surface the working region and foreground pixels of the output image that correspond to the foreground content in the first AR workspace.

For example, in one or more embodiments, the working region is the piece of paper (502) disposed in the first AR workspace (500). The background pixels correspond to a color of the paper (502). The foreground content comprises a marking (506) on the paper (502). The foreground pixels may correspond to a color and opacity of the marking (506).

Furthermore, in the output image (O1), the pixels corresponding to the marking (506) (i.e., text string "Hello!") may be set to a pixel value of (0, 0, 0) (i.e., black) and the pixels corresponding to the white surface of the paper (502) may be set to a pixel value of (255, 255, 255) (i.e., white) to maximize contrast. Alternatively, the pixels corresponding to the marking (506) may be set to a pixel value that matches the color and opacity of the marking (506).

Figure 5C:
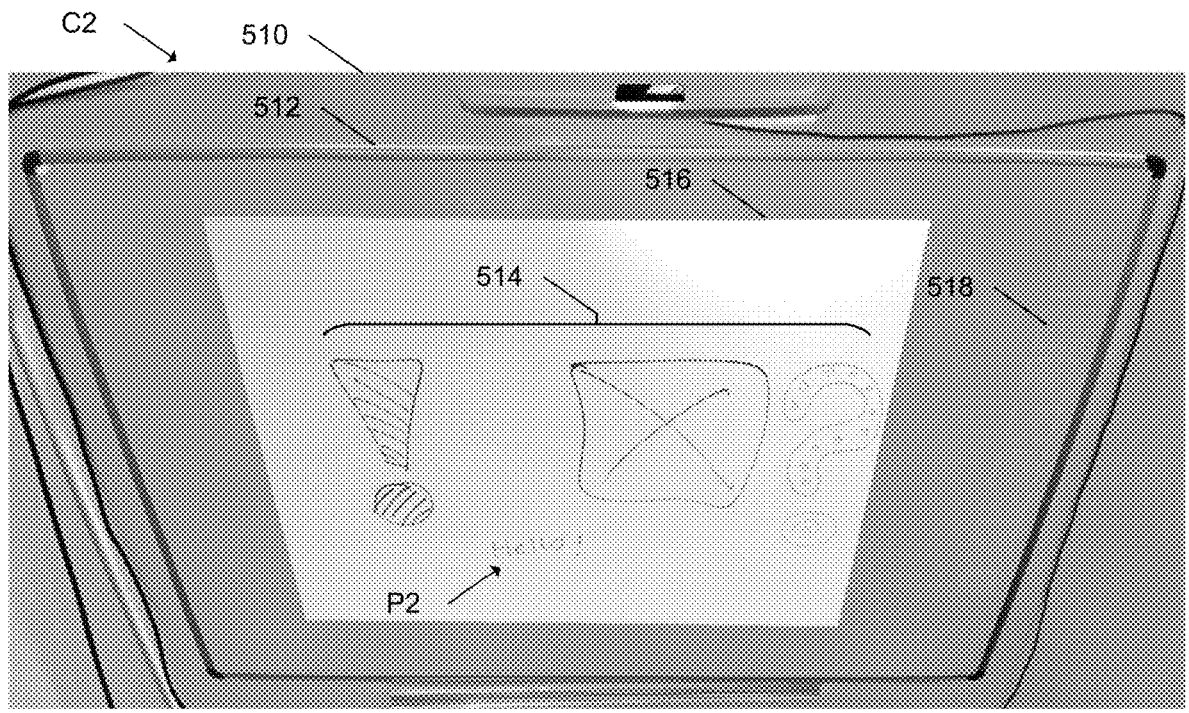

FIG. 5C shows a raw input image (C2) of the second AR workspace (510), captured by PIC-WB at S410' in Round 2. The working region of the whiteboard (512) includes markings (514) (i.e., the exclamation point, the crossed box, and the question mark) made by User 2 during the collaboration session. It will be appreciated that any new content (e.g., characters, text strings, images, charts, graphics, etc.) that is added to the whiteboard (512) (e.g., drawn onto the whiteboard (512), permanently or non-temporarily placed on or above the whiteboard (512), etc.) may become foreground content of the second AR workspace (510).

On the other hand, the background content of the second AR workspace (510) may include: the background surface of the whiteboard (516) (e.g., light background of the working region and/or the darker background surrounding the working region); and the projection of projector image (P2), derived from the output image (O1) in FIG. 5B.

In one or more embodiments, the PIC-WB may project a user interface (518) into the second AR workspace (510). The user interface (518) includes one or more controls for User 2 to control the PIC-WB and may be functionally identical to the user interface (508). On the other hand, the user interface (518) may be configured to improve usability of the second AR workspace (510) and may be functionally and cosmetically unique from user interface (508). Because the user interface (518) is virtual content created by the PIC-WB, the user interface (518) is generally part of the background content of the second AR workspace (510). In other embodiments, the user interface (518) may be designated as foreground content if User 2 wishes to share the information contained in the user interface (518).

Figure 5D:
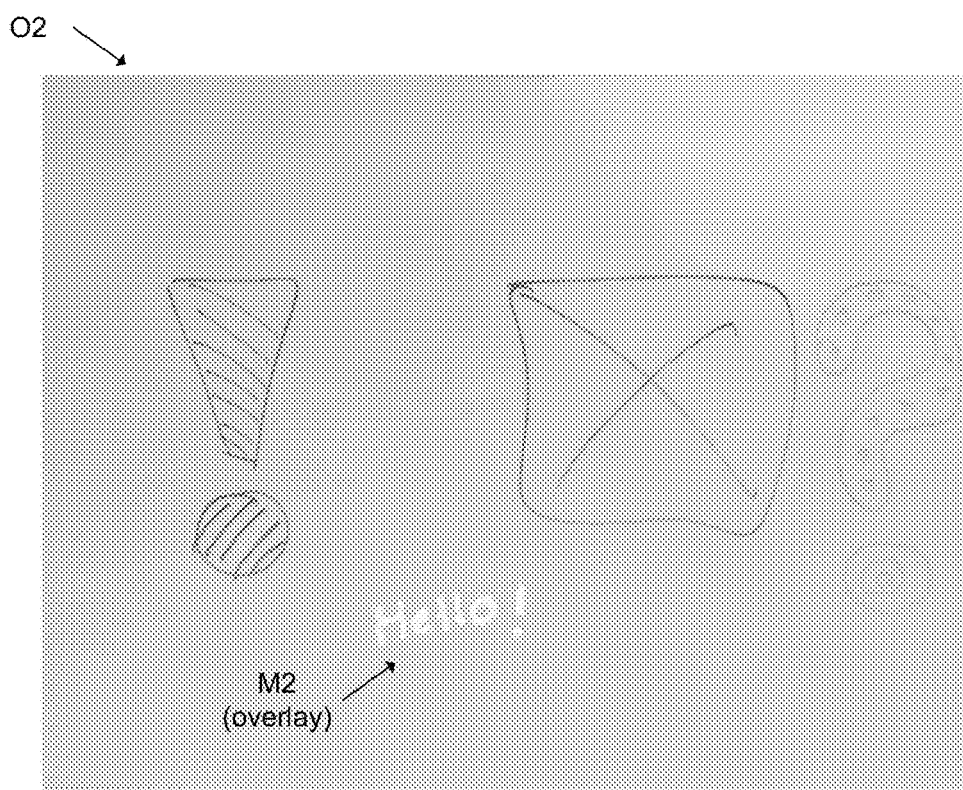

FIG. 5D shows a cropped, rotated, scaled, and cleaned output image (O2) of the second AR workspace (510) with a remote mask (M2), as discussed with respect to processes S435'-S445 in Round 2. Before overlaying the remote mask (M2), as discussed above with respect to processes S410'-S445' and S455'-S480', the PIC-WB captures an input image (C2) and generates an output image (O2) with the same standard dimensions and same standard resolution as the output image (O1) shown in FIG. 5B. The PIC-WB then aligns the remote mask (M2) with the output image (O2). Here, the overlay of the remote mask (M2) is visualized by highlighting the pixels corresponding to the marking (506) made by User 1 (i.e., text string "Hello!" from the first AR workspace). The markings (514) made by User 2 are local foreground content of the second AR workspace and therefore are not masked by remote mask (M2).

Figure 5E:
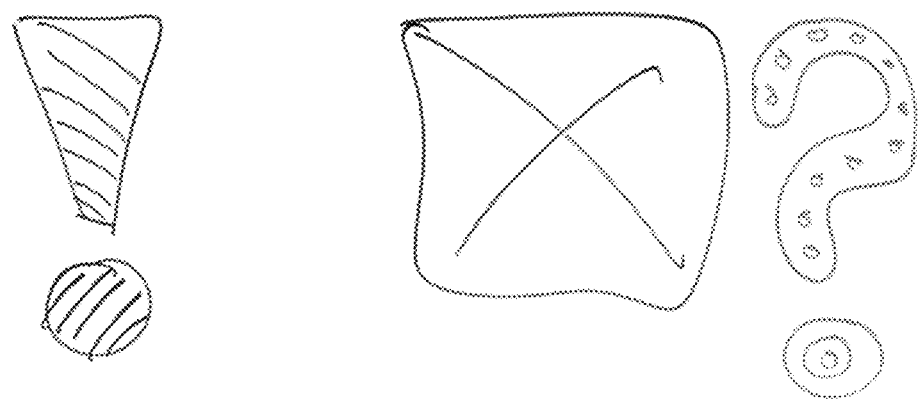

FIG. 5E shows the final masked output image (MO2) of the second AR workspace (510), generated by PIC-WB at S445' in Round 2. The masked output image (MO2) contains only the local foreground content (i.e., markings (516)) after applying the remote mask (M2). In one or more embodiments, generating the masked output image (MO2) further includes performing one or more image processing operations to enhance contrast between background pixels that correspond to a surface of the working region and foreground pixels that correspond to the foreground content (i.e., markings (514)) in the second AR workspace (510).

For example, in the masked output image (MO2), the pixels corresponding to the markings (514) may be set to a pixel value of (0, 0, 0) (i.e., black) and the pixels corresponding to work region of the whiteboard (510) may be set to a pixel value of (255, 255, 255) (i.e., white) to maximize contrast. Alternatively, the pixels corresponding to the markings (514) may be set to one or more pixel values that matches the color and opacity of the markings (514).

Figure 5F:
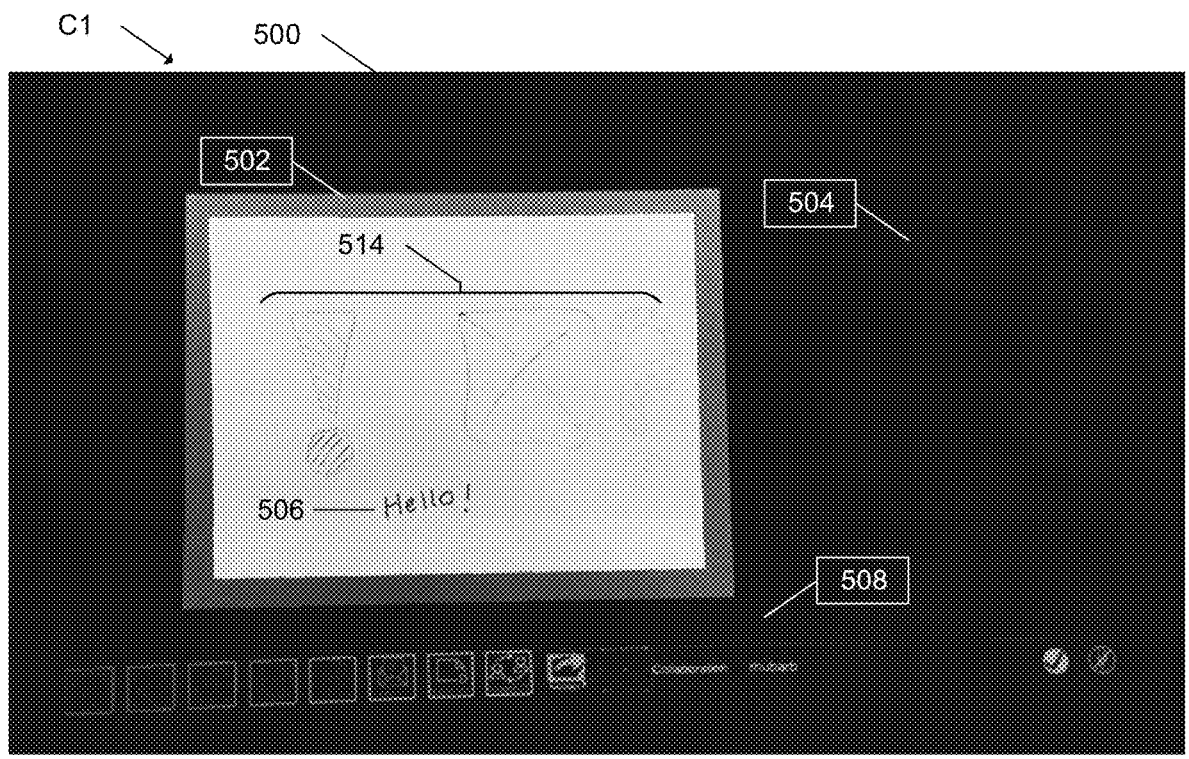

FIG. 5F shows a raw input image (C1) of the first AR workspace (500), captured by PIC-DT at S410 in Round 3. The first AR workspace (500) includes the paper (502) with marking (506) made by User 1 and a projection of projector image (P1) that includes the markings (514) made by User 2 in the second AR workspace (510). The input image (C1) of FIG. 5F contains both local foreground content (i.e., marking (506)) and background content (i.e., background (504), and the projected virtual content of markings (514)). As discussed above with respect to processes S455-S480, the PIC-DT obtains the masked output image (MO2) from the messaging server to generate a remote mask (M1) that can separate the foreground and background content.

Figure 5G:
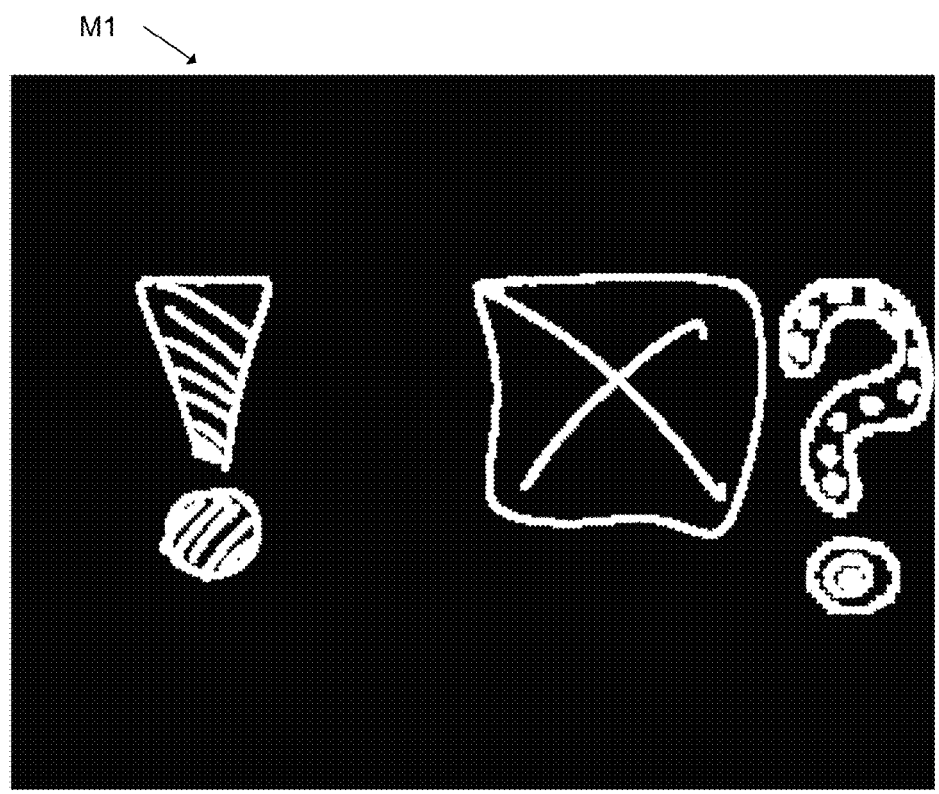

FIG. 5G shows the remote mask (M1) of the first AR workspace (500), generated by PIC-DT at S480 in Round 3. The markings (514) made by User 2 are eliminated from the input image (C1) shown in FIG. 5F by aligning and applying the remote mask (M1). In one or more embodiments, the remote mask (M1) is a binary image where pixel values of 1 indicate which pixels in the masked image will be eliminated.

Figure 6:
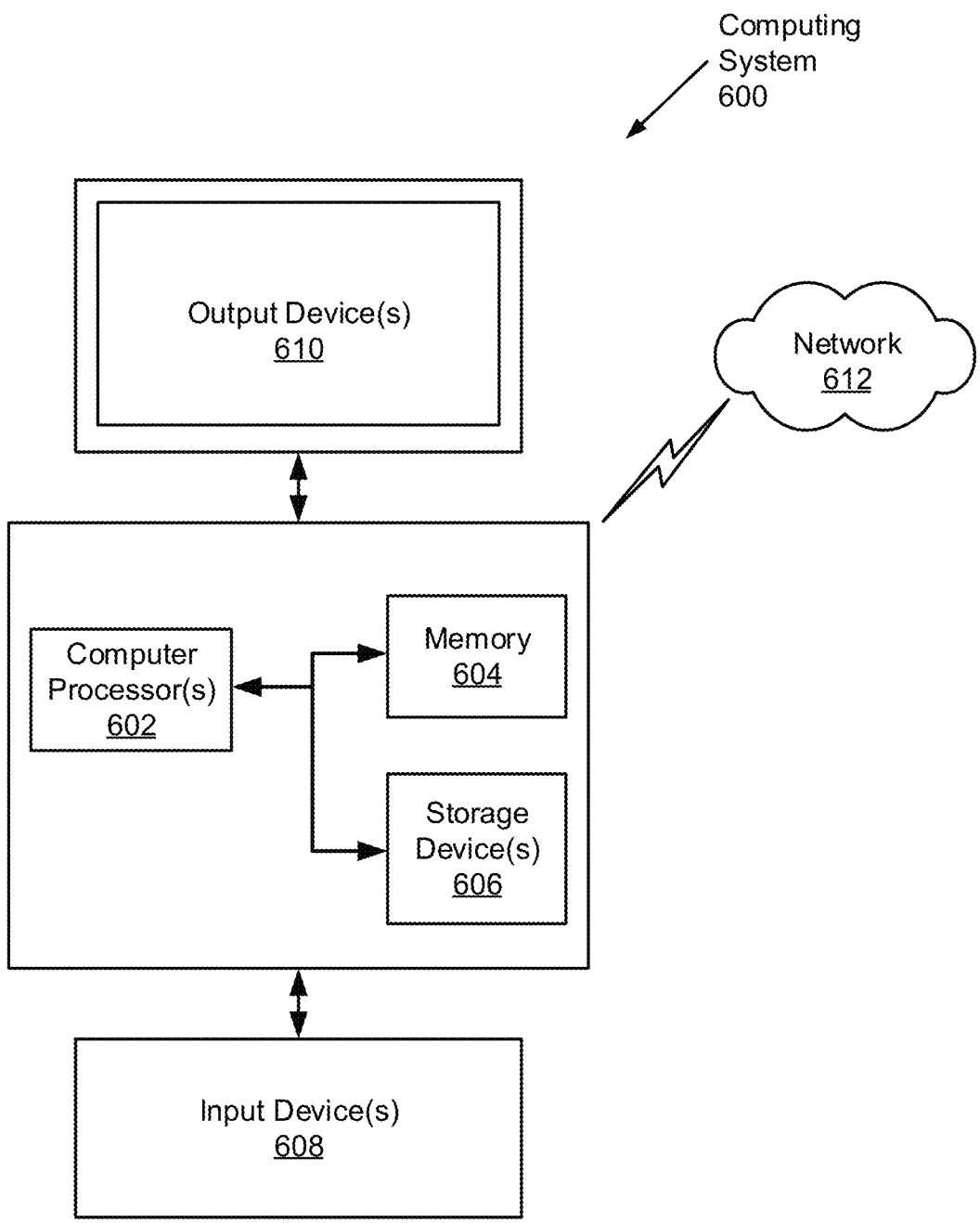
FIG. 6 shows a computing system in accordance with one or more embodiments of the invention.

Embodiments of the invention may be implemented on virtually any type of computing system, regardless of the platform being used. For example, the system (100) may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory), one or more storage device(s) (606) (e.g., a hard disk, an optical drive such as a compact disk (CD) drive or digital versatile disk (DVD) drive, a flash memory stick), and numerous other elements and functionalities. The computer processor(s) (602) may be an integrated circuit for processing instructions. For example, the computer processor(s) (602) may be one or more cores, or micro-cores of a processor. The computing system (600) may also include one or more input device(s) (608), such as a camera, imager, touchscreen, keyboard, mouse, microphone, touchpad, electronic pen, or any other type of input device. Further, the computing system (600) may include one or more output device(s) (610), such as a projector, screen (e.g., a liquid crystal display (LCD), a plasma display, touchscreen, cathode ray tube (CRT) monitor, or other display device), a printer, external storage, or any other output device. One or more of the output device(s) (610) may be the same or different from the input device(s) (608). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 7:
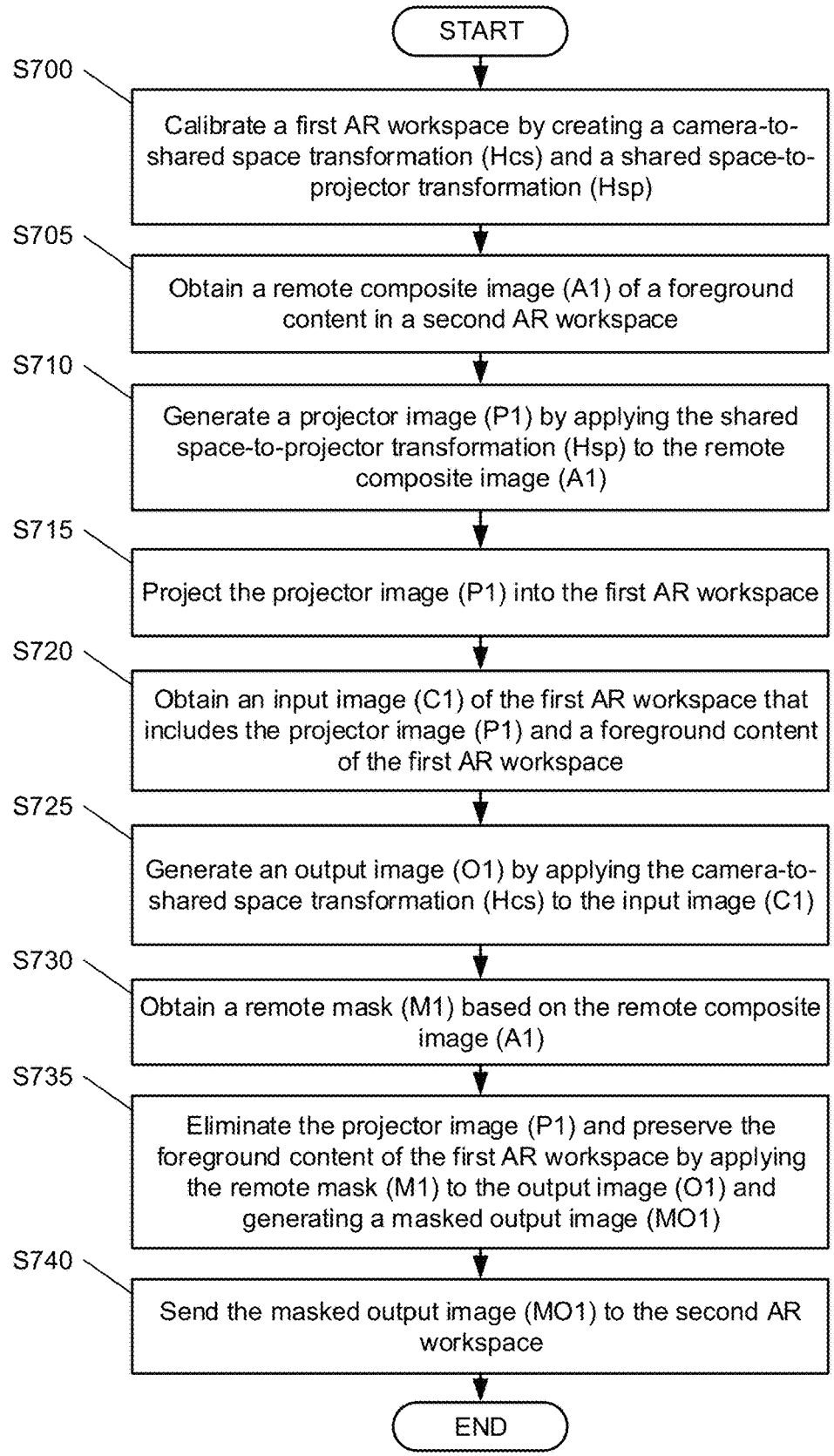
FIG. 7 shows a flowchart of a method in accordance with one or more embodiments of the invention.

FIG. 7 shows a flowchart of an image processing method for collaborating between a first augmented reality (AR) workspace and a second AR workspace in accordance with one or more embodiments of the invention. One or more of the individual processes in FIG. 7 may be performed by the system (100) of FIG. 1, as described above. One or more of the individual processes shown in FIG. 7 may be omitted, repeated, and/or performed in a different order than the order shown in FIG. 7. Accordingly, the scope of the invention should not be limited by the specific arrangement as depicted in FIG. 7.

At S700, a system (100) calibrates a first AR workspace by creating: a camera-to-shared space transformation (Hcs) between a camera coordinate space and a shared coordinate space; and a shared space-to-projector transformation (Hsp) between the shared coordinate space and a projector coordinate space.

At S705, the system (100) obtains a remote composite image (A1) of a foreground content in the second AR workspace. The remote composite image (A1) is formatted in the shared coordinate space.

At S710, the system (100) generates a projector image (P1) by applying the shared space-to-projector transformation (Hsp) to the remote composite image (A1).

At S715, the system (100) projects the projector image (P1) into the first AR workspace.

At S720, the system (100) obtains an input image (C1) of the first AR workspace that includes the projector image (P1) and a foreground content of the first AR workspace. The input image (C1) is formatted in the camera coordinate space.

At S725, the system (100) generates an output image (O1) by applying the camera-to-shared space transformation (Hcs) to the input image (C1). The output image (O1) is formatted in the shared coordinate space.

At S730, the system (100) obtains a remote mask (M1) based on the remote composite image (A1).

At S735, the system (100) eliminates the projector image (P1) and preserves the foreground content of the first AR workspace by applying the remote mask (M1) to the output image (O1) and generating a masked output image (MO1).

At S740, the system (100) sends the masked output image (MO1) to the second AR workspace.

Figure 8:
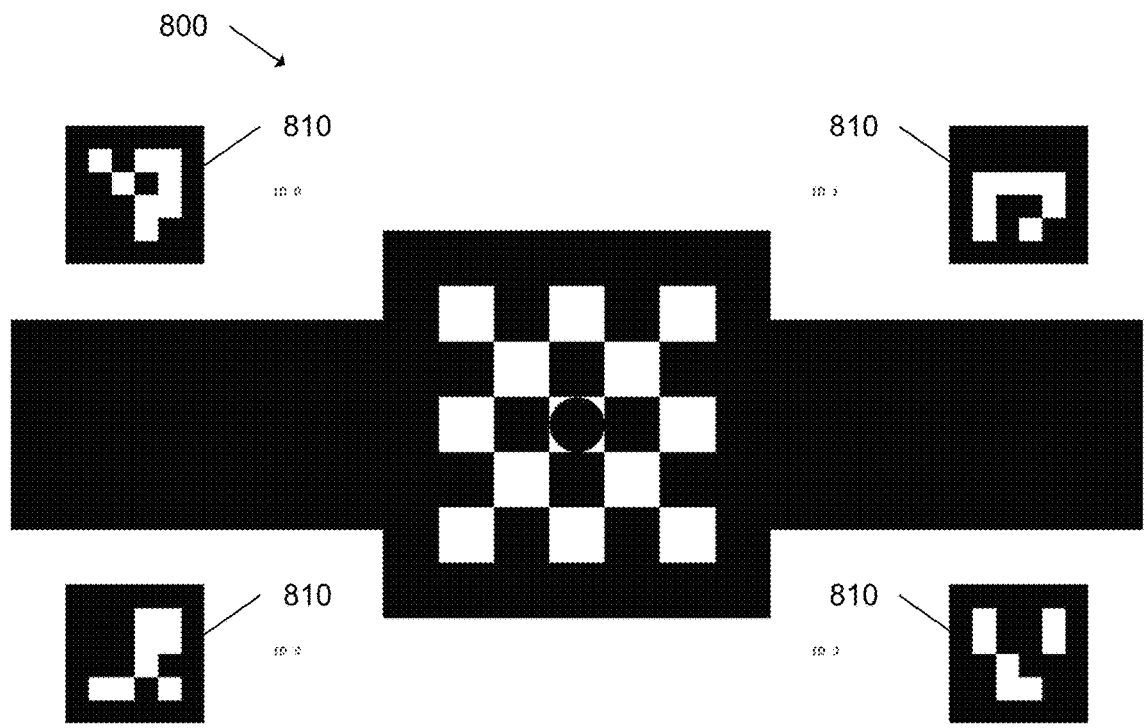
FIG. 8 shows an example of a target image in accordance with one or more embodiments of the invention.

FIG. 8 shows an example of a target image (800) in accordance with one or more embodiments of the invention. As discussed above, the target image (800) includes one or more embedded markers (810) and is projected into the AR workspace by the display engine (112).

An embedded marker (810) may be any pattern or image that can be identified by the parsing engine (106). As shown in the example target image (800), each embedded marker (810) may be a square fiducial marker comprising binary pixels (e.g., an ArUco marker). The transformation engine (108) may compute one or more transformations (e.g., the camera-to-projector transformation (Hcp)) based on the known coordinates of the embedded markers (810) in the target image (800).

Figure 9:
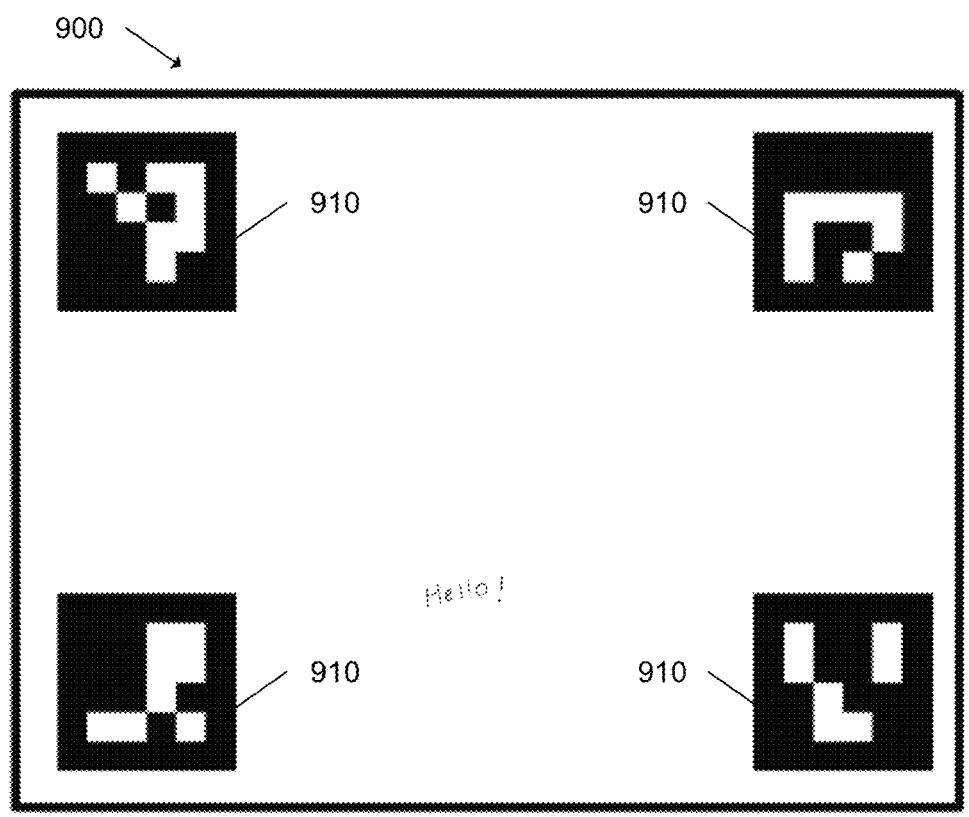
FIG. 9 shows an example of a physical target in accordance with one or more embodiments of the invention.

FIG. 9 shows an example of a physical target (900) in accordance with one or more embodiments of the invention. As discussed above, the physical target (900) is an object in the AR workspace that includes one or more markers (910) and is imaged by the imaging engine (104). In one or more embodiments, the physical target (900) may be a piece of paper or a whiteboard used for collaboration in an AR workspace. The transformation engine (108) may compute one or more transformations (e.g., the camera-to-shared space transformation (Hcs), the projector-to-world transformation (Hpw)) based on the known dimensions, patterns, and relative spacing of the markers in the second calibration image that contains the physical target (900).

A marker (910) may be any pattern or image that can be identified by the parsing engine (106). As shown in the example physical target (900), a marker (910) may be a square fiducial marker comprising binary pixels (e.g., an ArUco marker). Information about the markers (910) (e.g., physical dimensions, patterns, information about the physical object they are located on) may be loaded from the buffer (102) for known objects, recorded into the system (100) by the user for unrecognized objects, directly computed by the parsing engine (106) (e.g., embedded information in the marker itself), or any combination thereof. While the markers (910) shown in FIG. 9 are similar to the embedded markers (810) shown in FIG. 8 (e.g., individual binary patterns, relative placement), one of ordinary skill in the art will appreciate that the embedded markers (810) and markers (910) may be any pattern that is recognized by the parsing engine (106) and are not required to have any similarities.

One or more of the embodiments of the invention may have one or more of the following improvements to AR image processing technologies: the ability to differentiate between local foreground content (e.g., user input) and remote background content (e.g., virtual content that is projected) in an AR workspace; the ability to remove, from an image captured by the AR system, information that was projected by the same system without length color calibration processes; the ability to suppress a visual echo by masking captured images from an AR workspace without interrupting the AR projections (i.e., no synchronization required between projector and camera, no rapid flickering of a projector light source which may negatively affect the health of the user); the ability to decrease utilization of system resources (i.e., performing image processing at the source AR workspace before disseminating data to collaborators); and the ability to create an AR workspace that is continuously updated and conveyed in real-time (i.e., updating the AR output projection to include new information is less obvious or seamless to the user) without specialized equipment. These advantages demonstrate that one or more embodiments of the present invention are integrated into a practical application by improving resource consumption and reducing bandwidth requirements in the field of interactive AR collaborations.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing method for collaborating between a first augmented reality (AR) workspace and a second AR workspace, the method comprising:
    calibrating the first AR workspace by creating:
        a camera-to-shared space transformation between a camera coordinate space and a shared coordinate space; and
        a shared space-to-projector transformation between the shared coordinate space and a projector coordinate space;
    obtaining a remote composite image of a foreground content in the second AR workspace, wherein the remote composite image is formatted in the shared coordinate space;
    generating a projector image by applying the shared space-to-projector transformation to the remote composite image;
    projecting the projector image into the first AR workspace;
    obtaining an input image of the first AR workspace that includes the projector image and a foreground content of the first AR workspace, wherein the input image is formatted in the camera coordinate space;
    generating an output image by applying the camera-to-shared space transformation to the input image, wherein the output image is formatted in the shared coordinate space;
    obtaining a remote mask based on the remote composite image;
    eliminating the projector image and preserving the foreground content of the first AR workspace by applying the remote mask to the output image and generating a masked output image; and
    sending the masked output image to the second AR workspace.

2. The method of claim 1, wherein
    calibrating the first AR workspace further comprises creating:
        a camera-to-projector transformation between the camera coordinate space and the projector coordinate space by projecting a target image into the first AR workspace and then imaging the target image;
        a projector-to-world transformation between the projector coordinate space and a physical coordinate space of the first AR workspace by imaging a physical target of known dimensions in the first AR workspace; and
        a camera-to-world transformation by combining the camera-to-projector transformation and the projector-to-world transformation.

3. The method of claim 1, wherein applying the camera-to-shared space transformation to the input image further includes applying a normalization scheme that generates the output image with standard dimensions and a standard pixel resolution in the shared coordinate space.

4. The method of claim 3, wherein the standard dimensions are proportional to an area of a working region that is captured in the input image of the first AR workspace.

5. The method of claim 4, further comprising:
    after applying the normalization scheme, enhancing contrast between background pixels of the output image that correspond to a surface the working region and foreground pixels of the output image that correspond to the foreground content in the first AR workspace.

6. The method of claim 5, wherein
    the working region is a piece of paper disposed in the first AR workspace,
    the background pixels correspond to a color of the paper,
    the foreground content comprises a marking on the paper, and
    the foreground pixels correspond to a color and an opacity of the marking.

7. The method of claim 3, wherein
    the second AR workspace includes a plurality of remote workstations that each output a remote image formatted with the standard dimensions and the standard resolution of the shared coordinate space, and
    obtaining the remote composite image includes obtaining the plurality of remote images and merging the plurality of remote images into the remote composite image.

8. The method of claim 7, wherein
    merging the plurality of remote images includes applying a minimum operator to the plurality of remote images and determining a merged pixel value for each pixel in the shared coordinate space, and
    for each given pixel in the shared coordinate space, the minimum operator determines the merged pixel value by selecting the remote image with a highest contrast foreground pixel value, relative to a background pixel value in the same remote image, at the given pixel.

9. The method of claim 1, further comprising:
    generating a collaboration image by merging the masked output image and the remote composite image, wherein the collaboration image is formatted in the shared coordinate space.

10. The method of claim 1, wherein
    the input image of the first AR workspace is obtained with a Projection with Interactive Capture (PIC) device that comprises a camera and a projector, and
    the projector image is projected into the first AR workspace by the projector.

11. A non-transitory computer readable medium (CRM) storing computer readable program code for collaborating between a first augmented reality (AR) workspace and a second AR workspace, the computer readable program code causes a computer to:
    calibrate the first AR workspace by creating:
        a camera-to-shared space transformation between a camera coordinate space and a shared coordinate space; and
        a shared space-to-projector transformation between the shared coordinate space and a projector coordinate space;
    obtain a remote composite image of a foreground content in the second AR workspace, wherein the remote composite image is formatted in the shared coordinate space;
    generate a projector image by applying the shared space-to-projector transformation to the remote composite image;

project the projector image into the first AR workspace;
obtain an input image of the first AR workspace that includes the projector image and a foreground content of the first AR workspace, wherein the input image is formatted in the camera coordinate space;
generate an output image by applying the camera-to-shared space transformation to the input image, wherein the output image is formatted in the shared coordinate space;
obtain a remote mask based on the remote composite image;
eliminate the projector image and preserve the foreground content of the first AR workspace by applying the remote mask to the output image and generating a masked output image; and
send the masked output image to the second AR workspace.

12. The CRM of claim 11, wherein, in calibrating the first AR workspace, the computer readable program code further causes the computer to create:
a camera-to-projector transformation between the camera coordinate space and the projector coordinate space by projecting a target image into the first AR workspace and then imaging the target image;
a projector-to-world transformation between the projector coordinate space and a physical coordinate space of the first AR workspace by imaging a physical target of known dimensions in the first AR workspace; and
a camera-to-world transformation by combining the camera-to-projector transformation and the projector-to-world transformation.

13. The CRM of claim 11, wherein, in applying the camera-to-shared space transformation to the input image, the computer readable program code further causes the computer to further apply a normalization scheme that generates the output image with standard dimensions and a standard pixel resolution in the shared coordinate space.

14. The CRM of claim 11, wherein the computer readable program code further causes the computer to:
generate a collaboration image by merging the masked output image and the remote composite image, wherein the collaboration image is formatted in the shared coordinate space.

15. The CRM of claim 11, wherein computer readable program code further causes the computer to:
obtain the input image of the first AR workspace with a Projection with Interactive Capture (PIC) device that comprises a camera and a projector, and
project the projector image into the first AR workspace with the projector of the PIC device.

16. A system for collaborating between a first augmented reality (AR) workspace and a second AR workspace, the system comprising:
a memory; and
a processor coupled to the memory, wherein the processor:
calibrates the first AR workspace by creating:
a camera-to-shared space transformation between a camera coordinate space and a shared coordinate space; and
a shared space-to-projector transformation between the shared coordinate space and a projector coordinate space;
obtains a remote composite image of a foreground content in the second AR workspace, wherein the remote composite image is formatted in the shared coordinate space;
generates a projector image by applying the shared space-to-projector transformation to the remote composite image;
projects the projector image into the first AR workspace;
obtains an input image of the first AR workspace that includes the projector image and a foreground content of the first AR workspace, wherein the input image is formatted in the camera coordinate space;
generates an output image by applying the camera-to-shared space transformation to the input image, wherein the output image is formatted in the shared coordinate space;
obtains a remote mask based on the remote composite image;
eliminates the projector image and preserves the foreground content of the first AR workspace by applying the remote mask to the output image and generating a masked output image; and
sends the masked output image to the second AR workspace.

17. The system of claim 16, wherein, in calibrating the first AR workspace, the processor further creates:
a camera-to-projector transformation between the camera coordinate space and the projector coordinate space by projecting a target image into the first AR workspace and then imaging the target image;
a projector-to-world transformation between the projector coordinate space and a physical coordinate space of the first AR workspace by imaging a physical target of known dimensions in the first AR workspace; and
a camera-to-world transformation by combining the camera-to-projector transformation and the projector-to-world transformation.

18. The system of claim 16, wherein, in applying the camera-to-shared space transformation to the input image, the processor further applies a normalization scheme that generates the output image with standard dimensions and a standard pixel resolution in the shared coordinate space.

19. The system of claim 16, wherein the processor further:
generates a collaboration image by merging the masked output image and the remote composite image, wherein the collaboration image is formatted in the shared coordinate space.

20. The system of claim 16, wherein
the input image of the first AR workspace is obtained with a Projection with Interactive Capture (PIC) device that comprises a camera and a projector, and
the projector image is projected into the first AR workspace by the projector.

* * * * *